(12) United States Patent
Kimura et al.

(10) Patent No.: US 12,146,991 B2
(45) Date of Patent: Nov. 19, 2024

(54) SIGNAL PROCESSING APPARATUS

(71) Applicant: DENSO CORPORATION, Kariya (JP)

(72) Inventors: Shunsuke Kimura, Kariya (JP); Hidekazu Adachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 989 days.

(21) Appl. No.: 17/144,045

(22) Filed: Jan. 7, 2021

(65) Prior Publication Data

US 2021/0132192 A1 May 6, 2021

Related U.S. Application Data

(63) Continuation of application No. PCT/JP2019/027027, filed on Jul. 8, 2019.

(30) Foreign Application Priority Data

Jul. 11, 2018 (JP) .................................. 2018-131558

(51) Int. Cl.
*G01S 7/48* (2006.01)
*G01S 7/487* (2006.01)
*G01S 17/93* (2020.01)

(52) U.S. Cl.
CPC .............. *G01S 7/487* (2013.01); *G01S 17/93* (2013.01)

(58) Field of Classification Search
USPC ....................................................... 356/4.01
See application file for complete search history.

(56) References Cited

U.S. PATENT DOCUMENTS

| 7,602,477 B2 * | 10/2009 | Nakamura ............ G01S 7/497 |
| | | 356/5.15 |
| 10,514,295 B2 * | 12/2019 | Nishio ..................... G01V 8/18 |
| 11,125,866 B2 * | 9/2021 | Sumi ................... G01S 7/52046 |
| 2005/0200833 A1 | 9/2005 | Nakamura et al. |
| 2017/0356796 A1 | 12/2017 | Nishio |
| 2019/0129026 A1 * | 5/2019 | Sumi ................... G01S 7/52038 |

FOREIGN PATENT DOCUMENTS

| JP | H07-98374 A | 4/1995 | |
| JP | H07-140229 A | 6/1995 | |
| JP | 2001-305215 A | 10/2001 | |
| JP | 2014003647 A * | 1/2014 | ............ G10L 19/00 |
| JP | 2017118160 A * | 6/2017 | ............ E05F 15/43 |
| WO | WO-2016098355 A1 * | 6/2016 | ........... H04B 10/116 |
| WO | WO-2016136256 A1 * | 9/2016 | ............ G01R 27/04 |
| WO | WO-2017145207 A1 * | 8/2017 | ............ G08C 23/04 |

* cited by examiner

*Primary Examiner* — James R Hulka

(74) *Attorney, Agent, or Firm* — MASCHOFF BRENNAN

(57) ABSTRACT

The noise calculation unit applies a statistical process for the measurement signal of the first number of data to calculate the noise value. The calculation threshold setting unit sets the calculation threshold based on the noise value. The period determination unit determines a period where a difference between the measurement signal and a moving average value calculated in a previous cycle exceeds the calculation threshold, to be the non-calculation period of the baseline. The moving average calculation unit is configured such that the measurement signal in a period excluding the non-calculation period is moving-averaged for each second number of data to calculate the moving average value. The first number of data and the second number of data are set independently.

8 Claims, 20 Drawing Sheets

NO INHIBIT PERIOD IS PROVIDED

DETERMINATION THRESHOLD

OCCURRENCE OF UNDERSHOOT

SIGNAL PROCESSING APPARATUS

This application is the U.S. bypass application of International Application No. PCT/JP2019/27027 filed Jul. 8, 2019 which designated the U.S. and claims priority to Japanese Patent Application No. 2018-131558, filed Jul. 11, 2018, the contents of which are incorporated herein by reference.

BACKGROUND

Technical Field

The present disclosure relates to a signal processing apparatus that processes a measurement signal.

Description of the Related Art

For measurement signals measured by various measurement equipment, a baseline possibly changes due to a change in the measurement environment. For example, a laser radar apparatus mounted on a vehicle is assumed as a measurement apparatus. In the case where a scanning-type laser radar apparatus is mounted on the vehicle for scanning a light-reception visual field, when the background light significantly varies in the field of view, for example, sun light is reflected on a preceding vehicle having a black body, the baseline in the measurement signal measured by the laser radar apparatus varies.

SUMMARY

It is preferable that the present disclosure achieves highly accurate baseline correction. One aspect of the present disclosure is a signal processing unit provided with an input unit, a noise calculation unit, a calculation threshold setting unit, a period determination unit, a moving average calculation unit, an updating unit and a memory unit.

DETAILED DESCRIPTION OF THE PREFERRED EMBODIMENTS

For measurement signals measured by various measurement equipment, a baseline possibly changes due to a change in the measurement environment. For example, a laser radar apparatus mounted on a vehicle is assumed as a measurement apparatus. In the case where a scanning-type laser radar apparatus is mounted on the vehicle for scanning a light-reception visual field, when the background light significantly varies in the field of view, for example, sun light is reflected on a preceding vehicle having a black body, the baseline in the measurement signal measured by the laser radar apparatus varies. Moreover, in the case where a laser radar apparatus having a fixed light-reception visual field is mounted on the vehicle, when the vehicle moves to a bright area passing through a dark tunnel, the baseline of the measurement signal measured by the laser radar apparatus varies. As a laser radar apparatus having a fixed light-reception visual fields, a scanning type laser radar apparatus or a flash-type laser radar apparatus having the fixed light-reception visual field can be utilized. The analysis accuracy of the signal may be lowered if the baseline of the measurement signal varies. In this respect, the baseline is corrected by signal processing of the measurement signal.

For example, according to a radar apparatus described in the Japanese Patent Application Laid-Open Publication No. 2005-257405, the apparatus stores, as a reference value, a reception signal received when determined that no signal is present within a detection region, the signal being caused by laser light reflected at a reflection object to be detected (hereinafter referred to as reflected signal). The above-described radar apparatus subtracts the stored reference value from the reception signal, thereby correcting the baseline of the reception signal.

However, according to the above-described radar apparatus, when determined that pulse waveform having a clear peak in the waveform shape of the reception signal is present, the apparatus recognizes the pulse waveform to be the reflected signal, thereby determining that a reflection object is present. In this regard, the inventors have found, as a result of detailed research, an issue in which the accuracy of the baseline correction may decline since the reception signal including the reflected signal is stored as a reference value, when the pulse waveform of the reflected signal has no clear peak.

With reference to the drawings, embodiments of the present disclosure will be described.

First Embodiment

<1-1. Configuration>

Figure 1:
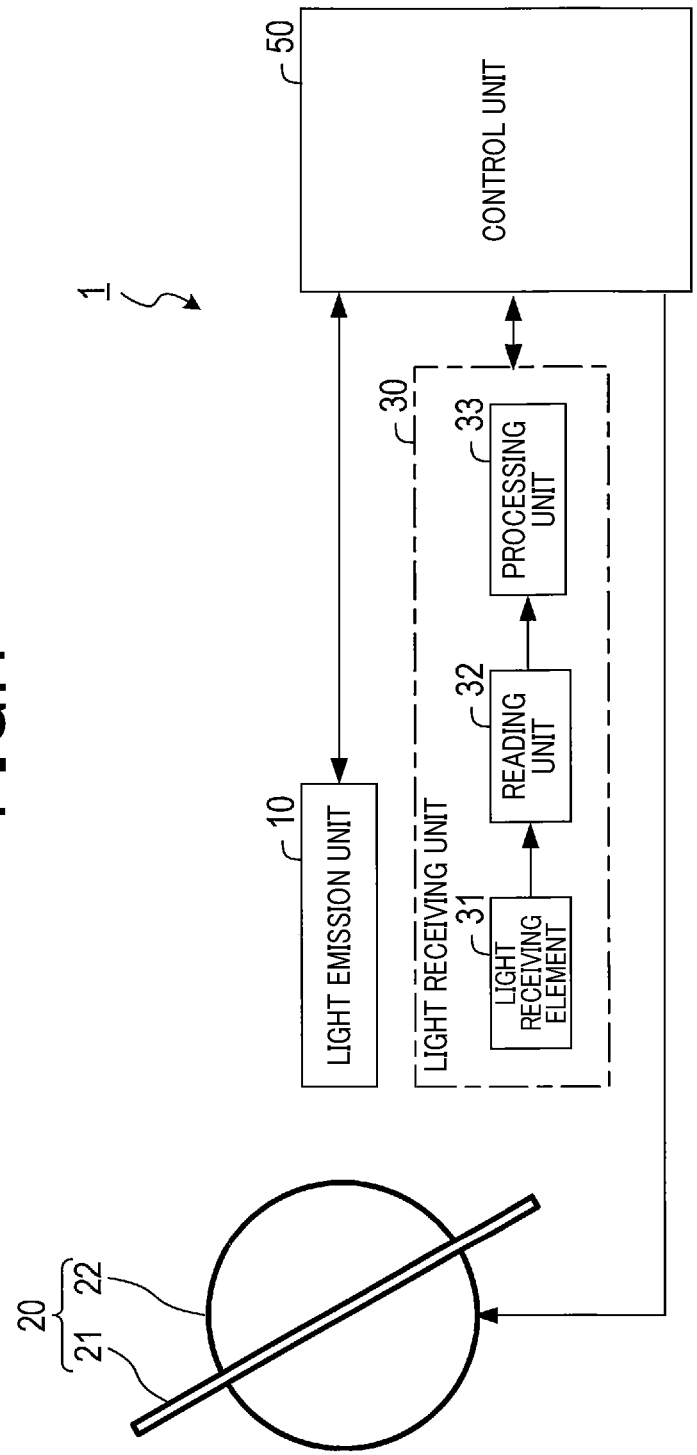
FIG. 1 is a block diagram showing a configuration of a laser radar apparatus.

With reference to FIG. 1, a configuration of a laser radar apparatus 1 according to the present embodiment will be described. The laser radar apparatus 1 is mounted on a vehicle, detects various objects existing in the vicinity of the vehicle and generates information about the detected object. According to the present embodiment, the laser radar apparatus 1 corresponds to a signal processing unit.

The laser radar apparatus 1 is provided with a light emission unit 10, a scanning unit 20, a light receiving unit 30 and a control unit 50.

The light emission unit 10 includes one or more emission elements and repeatedly emits pulsed laser light in response to an emission trigger signal from the control unit 50. As an emission element, for example, a laser diode is utilized.

The scanning unit 20 is provided with a mirror unit 21 and a drive unit 22.

The mirror unit 21 is configured as a plate like member and used as a reflection surface at both surfaces thereof. The mirror unit 21 reflects the emission light from the light emission unit 10, thereby irradiating light towards a direction based on the rotation angle of the mirror unit 21. The mirror unit 21 reflects the reflected light arriving from the direction based on the rotation angle of the mirror unit 21, and outputs the reflected light to the light receiving unit 30. The reflected light is produced by the object reflecting the emission light.

The drive unit 22 rotatably drives the mirror unit 21 in accordance with a command from the control unit 50. Thus, the emission light emitted from the light emission unit 10 via the mirror unit 21 scans a probing region. The probing region has an angle range set in advance within the horizontal surface.

The light receiving unit 30 is provided with a light receiving element 31, a reading unit 32 and a processing unit 33.

The light receiving unit 31 includes one or more light receiving elements, receives the laser light arriving from the probing region and outputs a received light signal having a current value based on the light reception intensity. As the light receiving element, for example, a photo diode (i.e. PD) or an avalanche photo diode (i.e. APD) may be utilized. For the APD, a so called single photon avalanche diode which operates in a Geiger mode (i.e. SPAD) may be used. The reading unit 32 converts the received light signal to be a detection signal having a voltage value based on the light reception intensity. Moreover, the reading unit 32 samples the detection signal to be converted to a 12-bit AD conversion value, and outputs the AD conversion value to the processing unit 33.

For example, the processing unit 33 recognizes the 12-bit AD conversion value to be a measurement signal S indicating the reception signal intensity and executes a signal processing for the measurement signal S. The processing unit 33 calculates the distance to an object which reflects the laser light based on the emission trigger signal which the control unit 50 outputs towards the light emission unit 10. According to the present embodiment, the processing unit 33 is configured of a hardware circuit such as field-programmable gate array (i.e. FPGA) to accomplish respective functions of an input unit, a noise calculation unit, a calculation threshold setting unit, a period determination unit, a moving average calculation unit, an updating unit, a memory unit, a resetting unit, a signal threshold generation unit and a signal determination unit.

The control unit 50 is provided with a microcomputer including a CPU, a ROM and a RAM. The control unit 50 outputs the emission trigger signal to the light emission unit and causes the light emission unit 10 to output the laser light. Also, the control unit 50 controls the light receiving unit 30 such that the detection signal is sampled at predetermined intervals. Further, the control unit 50 operates the scanning unit 20 such that entire probing region is scanned while the mirror unit 21 half rotates.

<1-2. Signal Processing>

Figure 5:
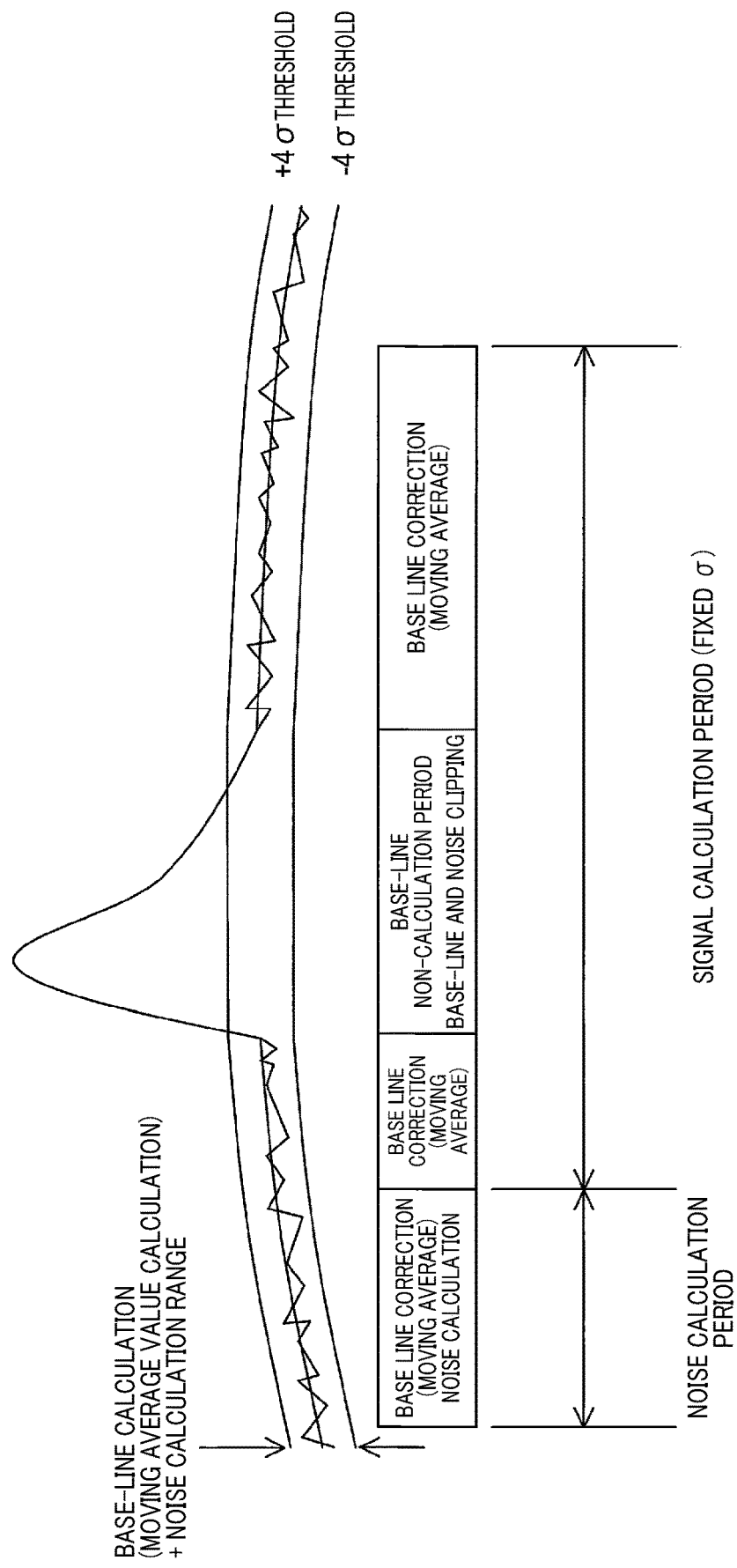
FIG. 5 is a diagram showing a calculation period of a noise value and a reflection signal, and a calculation range to be calculated of a baseline and a noise value according to a first embodiment.

Next, a signal processing executed by the processing unit 33 will be described. FIG. 5 shows a waveform of the measurement signal S acquired in a single azimuth. The baseline of the measurement signal S, that is, 0 level line, possibly varies in the case where the background light significantly varies in the field of view of the laser radar apparatus 1. The analysis accuracy of the signal may be lowered if the baseline of the measurement signal S varies. Hence, the processing unit 33 corrects the baseline of the measurement S.

In more detail, the processing unit 33 determines the moving average value $\mu$ calculated by applying a moving average for the measurement signal S at each moving average number Nmove to be the baseline. Then, the processing unit 33 subtracts the moving average value $\mu$ from the measurement signal S, thereby correcting the baseline. Also, the processing unit 33 determines the calculation object of the moving average value $\mu$ to be the measurement signal S in a period excluding the non-calculation period in an acquiring period for the single azimuth. The non-calculation period refers to a period where the moving average value $\mu$ is not calculated using the measurement signal S acquired in the non-calculation period.

The processing unit 33 compares the difference between the measurement signal S and the moving average value $\mu$ and the calculation threshold Thb, thereby determining whether it is the non-calculation period of the baseline. The processing unit 33 applies a statistical process to the measurement signal S of the calculation number Nnoise to calculate noise value $\sigma$ indicating a variation of the measurement signal S, and calculates the calculation threshold Thb based on the calculated noise value $\sigma$. According to the present embodiment, the processing unit 33 calculates a standard deviation value as a noise value, from the measurement signal S of the calculation number Nnoise and determines the calculation threshold Th to be $4\sigma$.

Here, the noise value $\sigma$ shows its accuracy such that the larger the calculation number Nnoise, the higher the accuracy is. On the other hand, in the case where the moving average number Nmove is too large, the trackability of the moving average value µ with respect to the variation of the baseline is lowered. In other words, a shift between the moving average value µ and the actual baseline becomes significant. Therefore, the calculation number Nnoise and the moving average Nmove are independently set in advance. Specifically, the calculation number Nnoise is set to be larger than the moving average number Nmove.

Figure 2:
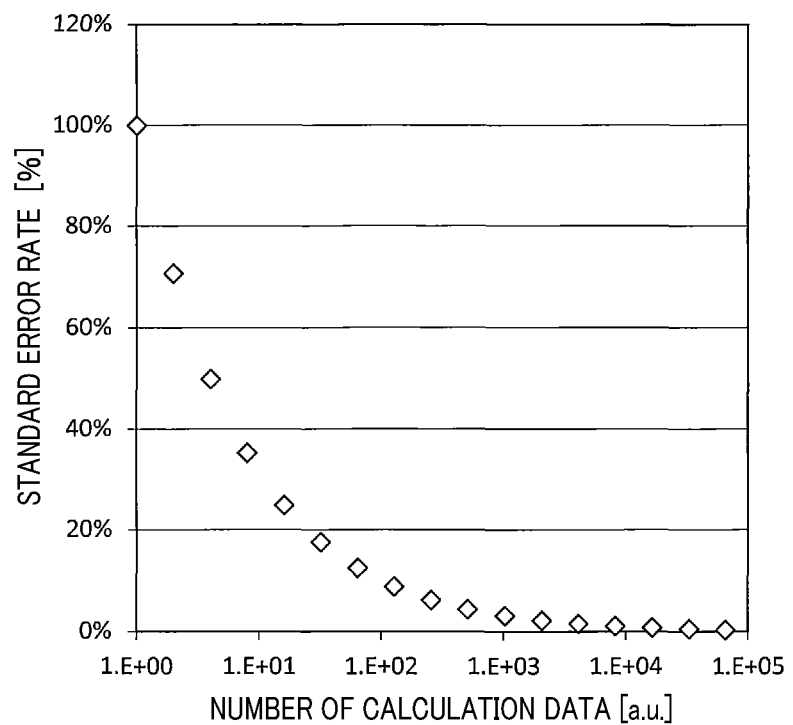
FIG. 2 is a diagram showing a relationship between the noise calculation number and a standard error rate.
Figure 3:
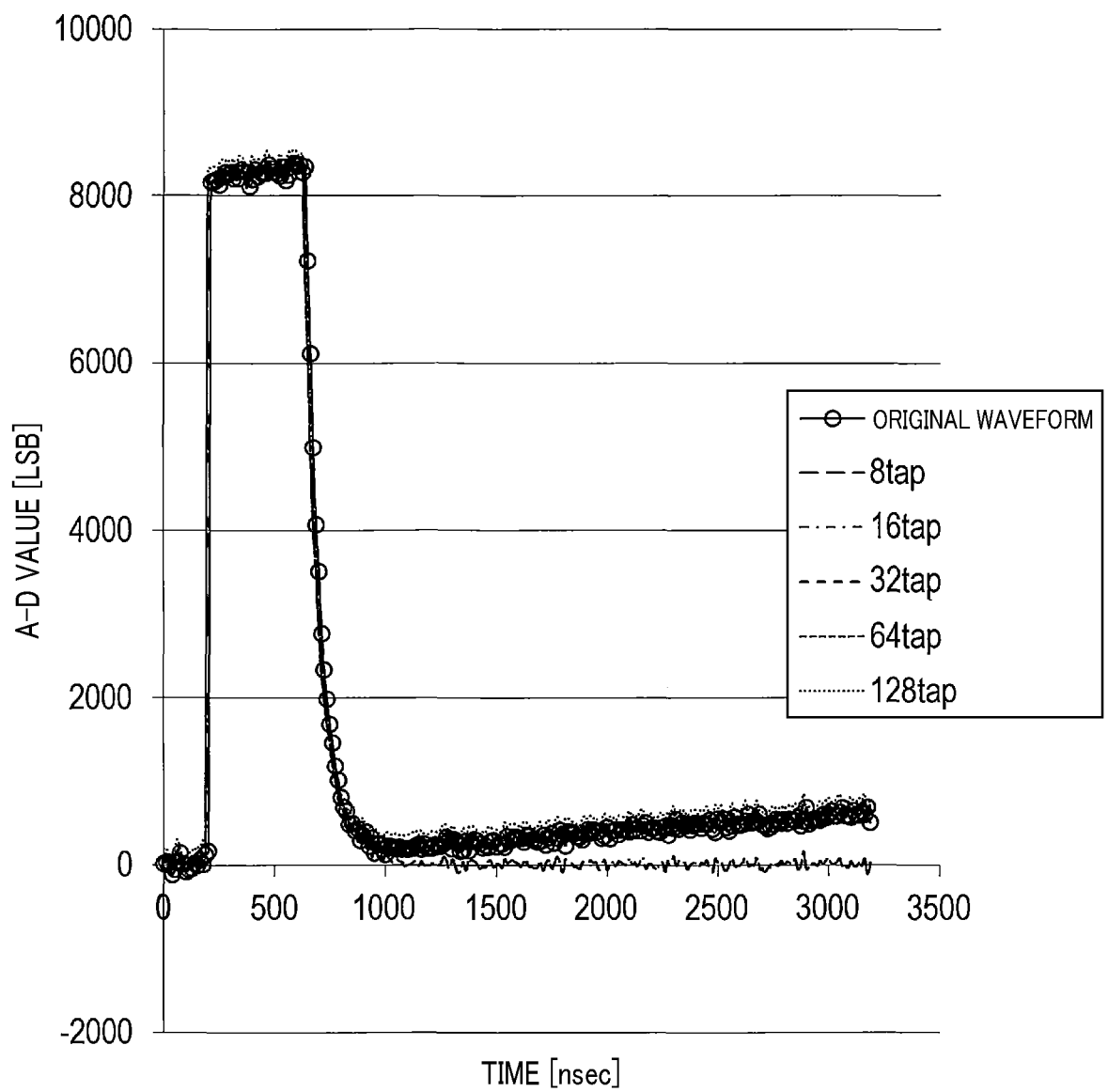
FIG. 3 is a diagram showing a waveform of a measurement signal and a waveform of a post-correction signal when the number of moving averages is changed.
Figure 4:
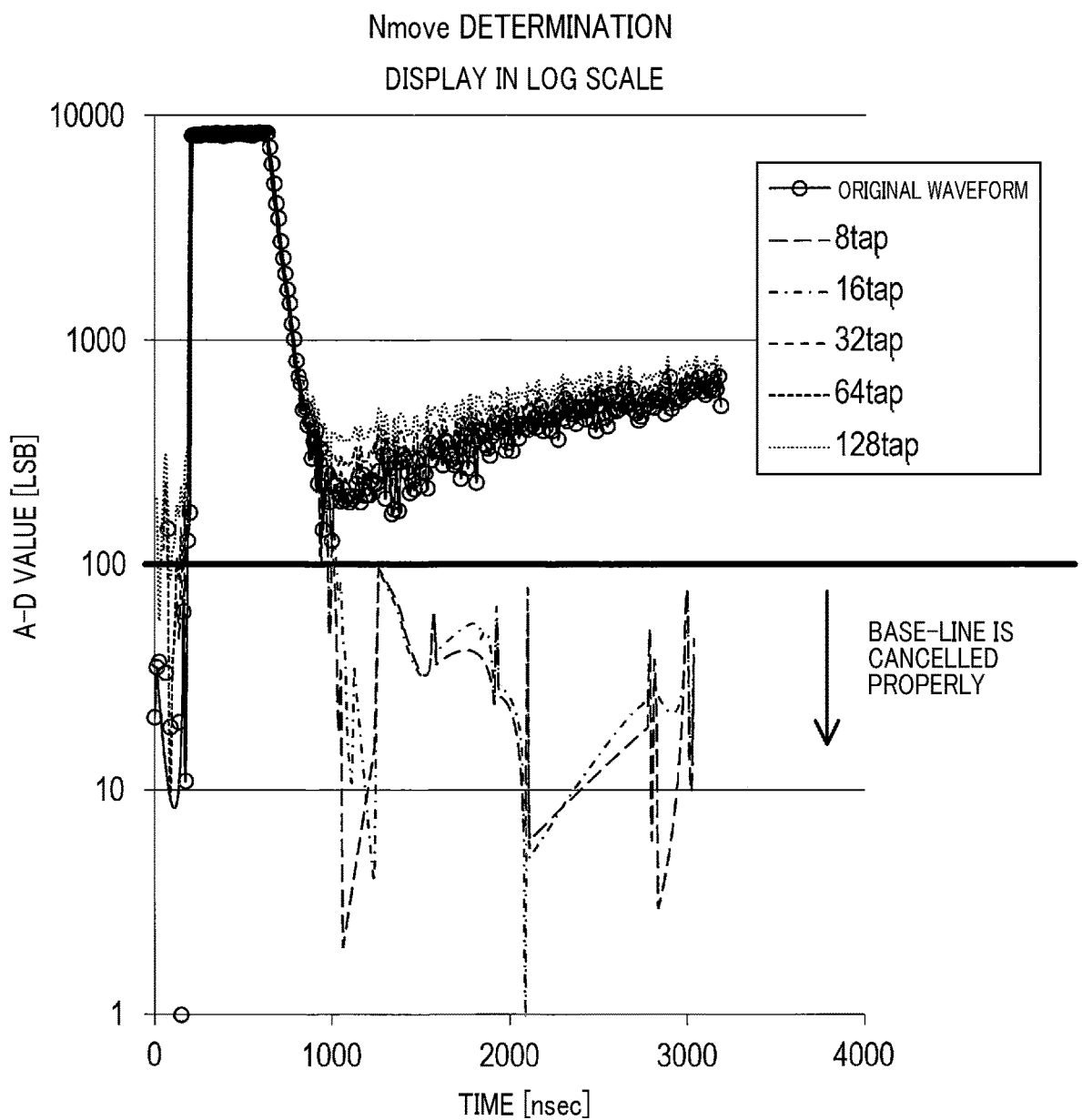
FIG. 4 is a graph indicated in logarithm-scale showing respective waveforms shown in FIG. 3.

FIG. 2 shows a relationship between the calculation number Nnoise and the standard error rate. The standard error rate is preferably 10% or less. Hence, according to the present embodiment, the calculation number Nnoise is set to be 128. Further, FIGS. 3 and 4 show a waveform of the measurement signal S and a waveform of the measurement signal S (hereinafter referred to as post-correction signal D) after the baseline correction when the moving average number Nmove is changed through 8, 16, 32, 64 and 128. It is realized that the baseline is appropriately corrected when the moving average number Nmove is 16 and 18. Hence, the moving average number Nmove is set to be 16 or less. The moving average number Nmove is preferably set to be the power of 2 in order to suppress an increase in a calculation load and the circuit size.

According to the present embodiment, as shown in FIG. 5, the first predetermined period in an acquiring period of a single azimuth is determined as a noise calculation period, and the rest of the period is determined as a signal calculation period. The noise calculation period corresponds to a period in which the measurement signal S having the calculation number Nnoise is inputted to the processing unit 33 from the reading unit 32. In the signal calculation period, the processing unit 33 fixes the noise value σ calculated in the noise calculation period. Hereinafter, a noise value calculation process and a baseline correction process will be described.

<1-2-1. Noise Value Calculation Process>

Figure 6:
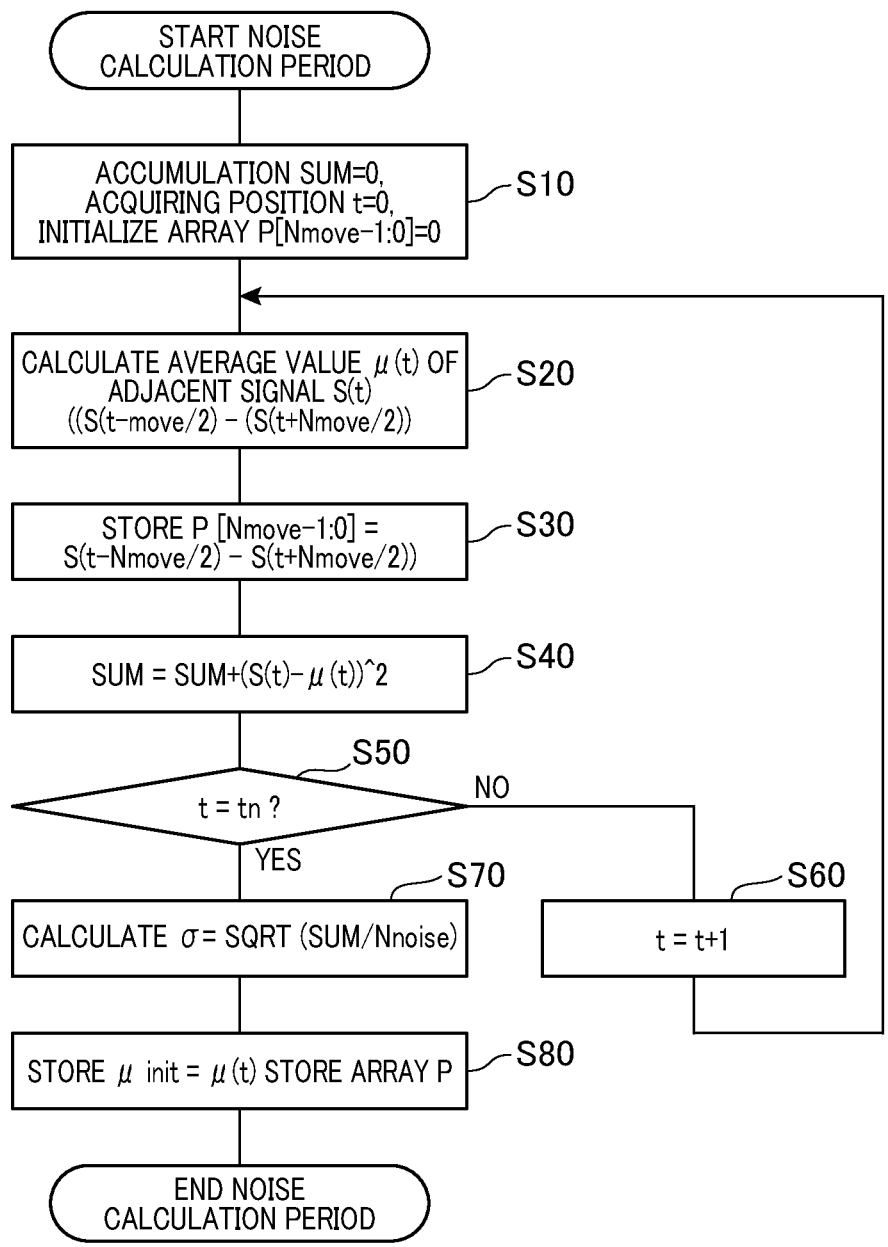
FIG. 6 is a flowchart showing a procedure of a noise calculation process according to the first embodiment.

Next, the noise value calculation process executed by the processing unit 33 will be described with reference to a flowchart shown in FIG. 6. The processing unit starts executing the process every time when completing the measurement of the single azimuth.

Firstly, at step S10, the processing unit 33 initializes an accumulation value SUM, an acquisition position t and an array P [Nmove-1:0] to be 0. The acquiring position t refers to an acquiring position of the measurement signal S in the noise calculation period. The array P [Nmove-1:0] refers to an array where the number of elements is Nmove.

Subsequently, at step S20, the processing unit 33 acquires a measurement signal S (t) at the acquiring position t and averages the Nmove measurement signals S from S (t−Nmove/2) to S (t+Nmove/2) adjacent to the measurement signal S (t) to calculate the average value µ (t).

Subsequently, at step S30, the processing unit 33 stores the Nmove measurement signals of S (t−Nmove/2) to S (t+Nmove/2) which are calculation objects of the average value µ (t) to the array P[Nmove-1:0].

Next, at step S40, the processing unit 33 updates the accumulation value SUM to be a value where squared S (t)−µ(t) is added to the accumulation value SUM.

Subsequently, at step S50, the processing unit 33 determines whether the acquiring position t is the final position tn of the noise calculation period. The processing unit 33 proceeds to step S60 when the acquiring position t is different from the final position tn and updates the acquiring position t to be t+1. Thereafter, the process returns to the process at step S20.

On the other hand, the processing unit 33 proceeds to step S70 when the acquiring position t is the final position tn and calculates the noise value σ. Specifically, the processing unit 33 calculates, as the noise value σ, a square root of a value where the accumulation value SUM updated at step S40 is divided by the calculation number Nnoise.

Subsequently, at step S80, the processing unit 33 stores the average value µ (t) calculated at step S20 to be an initial value µinit of the moving average value µ, and stores the array P where the measurement signal S is stored at step S30. The initial value µinit refers to a value used for calculating the moving average value µ in the baseline correction process which will be described later. Then, the process is terminated.

<1-2-2. Baseline Correction Process>

Next, the baseline correction process executed by the processing unit 33 will be described with reference to a flowchart shown in FIG. 7. The processing unit 33 starts the present process after terminating the noise calculation process shown in FIG. 3.

Firstly, at step S100, the processing unit 33 sets the µinit stored at step S80 to the moving average value µ(t−1) to initialize the acquiring position t to be 0. The moving average value µ (t−1) refers to an initial value of the moving average value to be calculated in the baseline correction process. The acquiring position t refers to an acquiring position of the measurement signal S in the signal calculation period.

Figure 8:
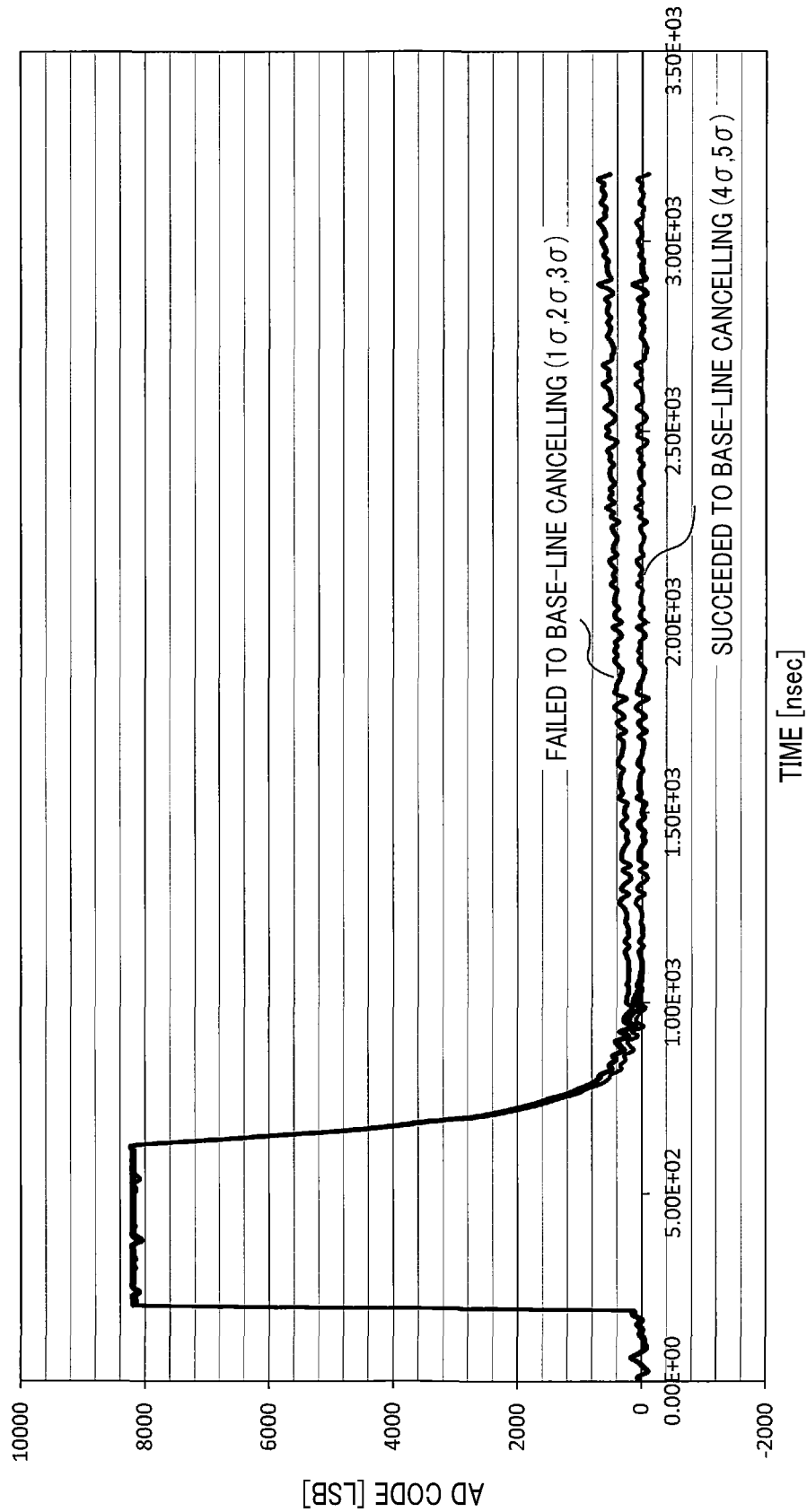
FIG. 8 is a graph showing a waveform of a post correction signal when a determination threshold is changed.

Subsequently, at step S110, the processing unit 33 acquires the measurement signal S (t) at the acquiring position t, and sets the calculation threshold Thb using the noise value σ calculated at step S70. As shown in FIG. 8, since the baseline can be properly corrected in the case where the determination threshold is set to be 4 times or larger of the noise value σ, the calculation threshold Thb may preferably be set 4σ or 5σ. Here, the processing unit 33 sets the calculation threshold Thb to be 4σ. Then, the processing unit 33 determines whether the difference between the moving average value µ(t−1) and the measurement signal S (t) is larger than the calculation threshold Thb.

The processing unit 33 determines that the acquiring position t is in the baseline calculation period in the case where the difference is the calculation threshold Thb or less, and proceeds to step S120. On the other hand, the processing unit 33 determines that the acquiring position t is in the non-calculation period in the case where the difference is larger than the calculation threshold Thb, and proceeds to step S130.

At step S120, the processing unit 33 calculates the moving average value µ(t) at the acquiring position t. The moving average value µ(t−1) is a value in which Nmove pieces of P[Nmove-1:0] are averaged. The moving average value µ(t) is a value in which (Nmove-1) pcs of P [Nmove-2:0] included in the P[Nmove-1:0] and the S (t) are averaged. Hence, the moving average value µ(t) equals to µ(t−1)+(S (t)−P[Nmove-1])/Nmove.

The processing unit 33 stores P[Nmove-2:0] into P[Nmove-1:1], and stores P[0] into S(t). In other words, the processing unit 33 shifts, by one position, the position of the array P stored at one before acquiring position, and adds the measurement signal S (t) at the acquiring position t to the array P.

However, the processing unit 33 does not use the measurement signal S in a period between the start time of the non-calculating period and a time a predetermined prior period prior to the start time of the non-calculating period, for the calculation of the moving average value µ. In other words, the processing unit 33 does not use the measurement signal in a prior period immediately before the start time of the non-calculation period, for the calculation of the moving average value μ. Further, the processing unit 33 does not use the measurement signal S in a period from the end time of the non-calculating period to a time when a predetermined latter period elapses, for the calculation of the moving average value μ. That is, the processing unit 33 does not use the measurement signal in a latter period immediately after the non-calculation period, for the calculation of the moving average period μ.

Figure 9:
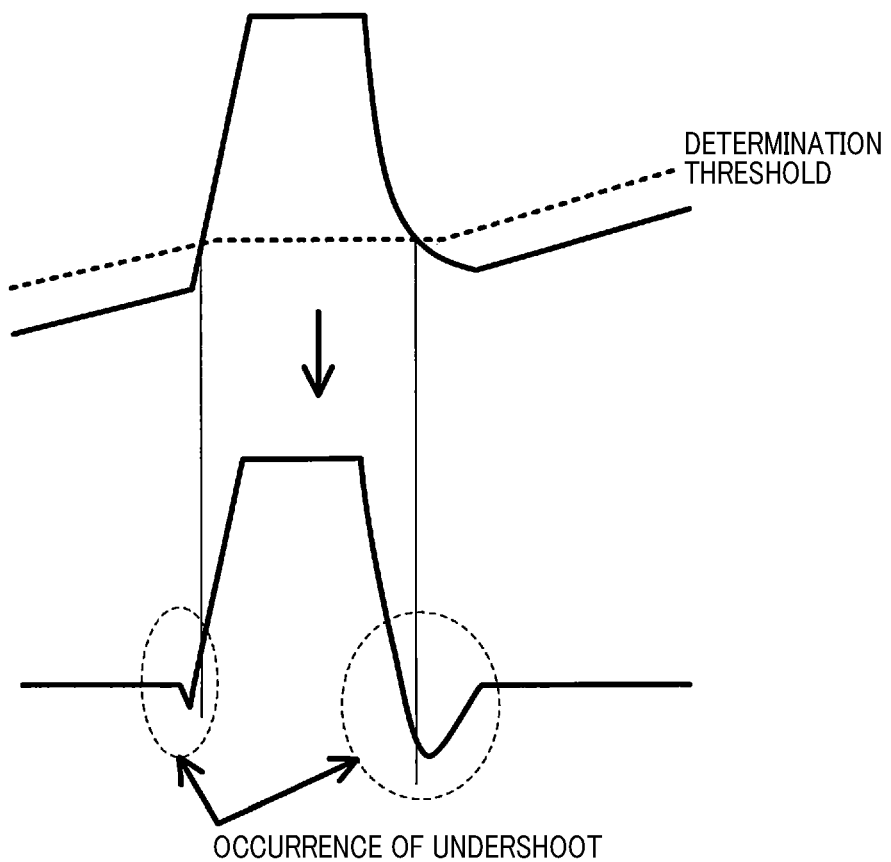
FIG. 9 is a diagram showing an occurrence of an undershoot of a waveform of a post-correction signal in the case where an inhibit period is not provided in a calculation period of the moving average value.

FIG. 9 shows a waveform of the measurement signal S and a waveform of the post-correction signal D in the case where an inhibit period inhibiting the calculation of the moving average value before/after the non-calculation period is not provided. The post correction signal D is calculated by subtracting the moving average value μ from the measurement signal S. In this case, in a period before/after the non-calculation period, the level of the moving average value μ rises in response to a rising section and a falling section of the reflected signal. Hence, an undershoot appears on the waveform of the post-correction signal D in a period before/after the non-calculation period.

Figure 10:
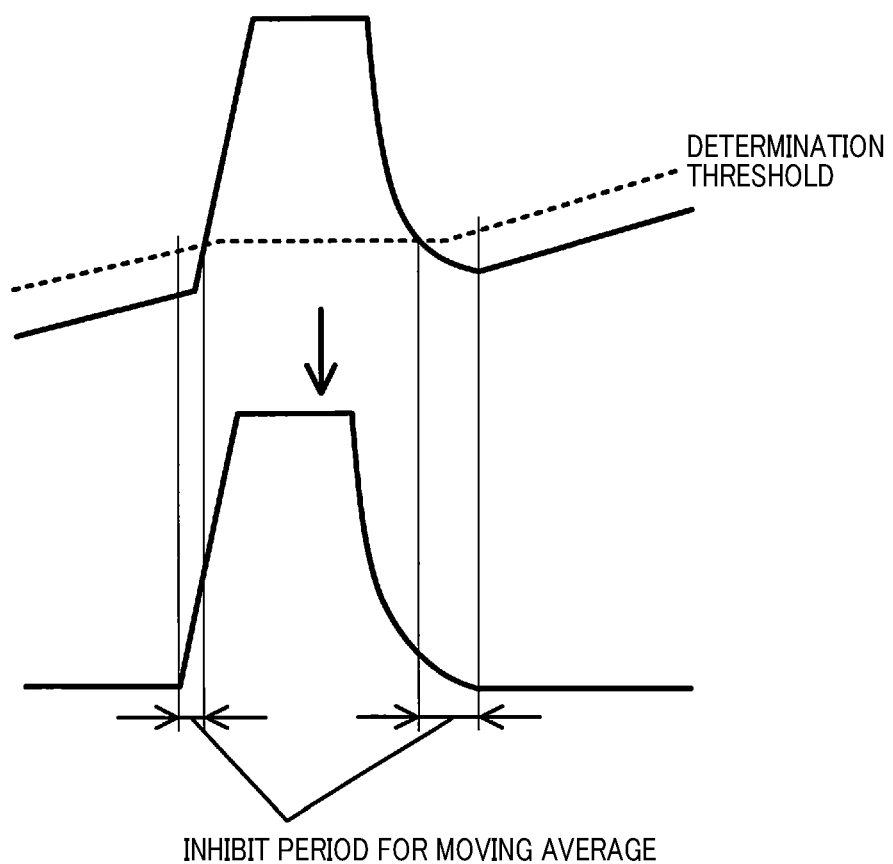
FIG. 10 is a diagram showing suppression of the undershoot of the waveform of the post-correction signal in the case where the inhibit period is provided in the calculation period of the moving average value.

FIG. 10 shows a waveform of the measurement signal S and a waveform of a post-correction signal D in the case where an inhibition period is provided before/after the non-calculation period. In this case, since the rising section and the falling section of the reflected signal is not regarded as the calculation object of the moving average value μ, the moving average value μ can be prevented from being raised before/after the non-calculation period. Accordingly, undershoot is suppressed on the waveform of the post correction signal D.

Further, since the measurement signal S in the non calculation period is not suitable for calculating the baseline, the processing unit 33 determines the measurement signal S in the non calculation period to be non-calculation object of the moving average value. Hence, at step S130, the processing unit 33 determines the moving average value μ (t−1) to be the moving average value μ (t). In other words, the processing unit 33 fixes the baseline in the non-calculation period.

Subsequently, at step S140, the processing unit 33 updates the measurement signal S (t−Nmove/2) to be the post-correction signal D (t−Nmove/2). The post correction signal D (t−Nmove/2) refers to a value in which the time of the measurement signal (t) is shifted to past time by a period of Nmove/2, and the moving average value μ (t) is subtracted from the measurement signal S (t−Nmove/2) of which the time is shifted, thereby correcting the baseline.

Figure 11:
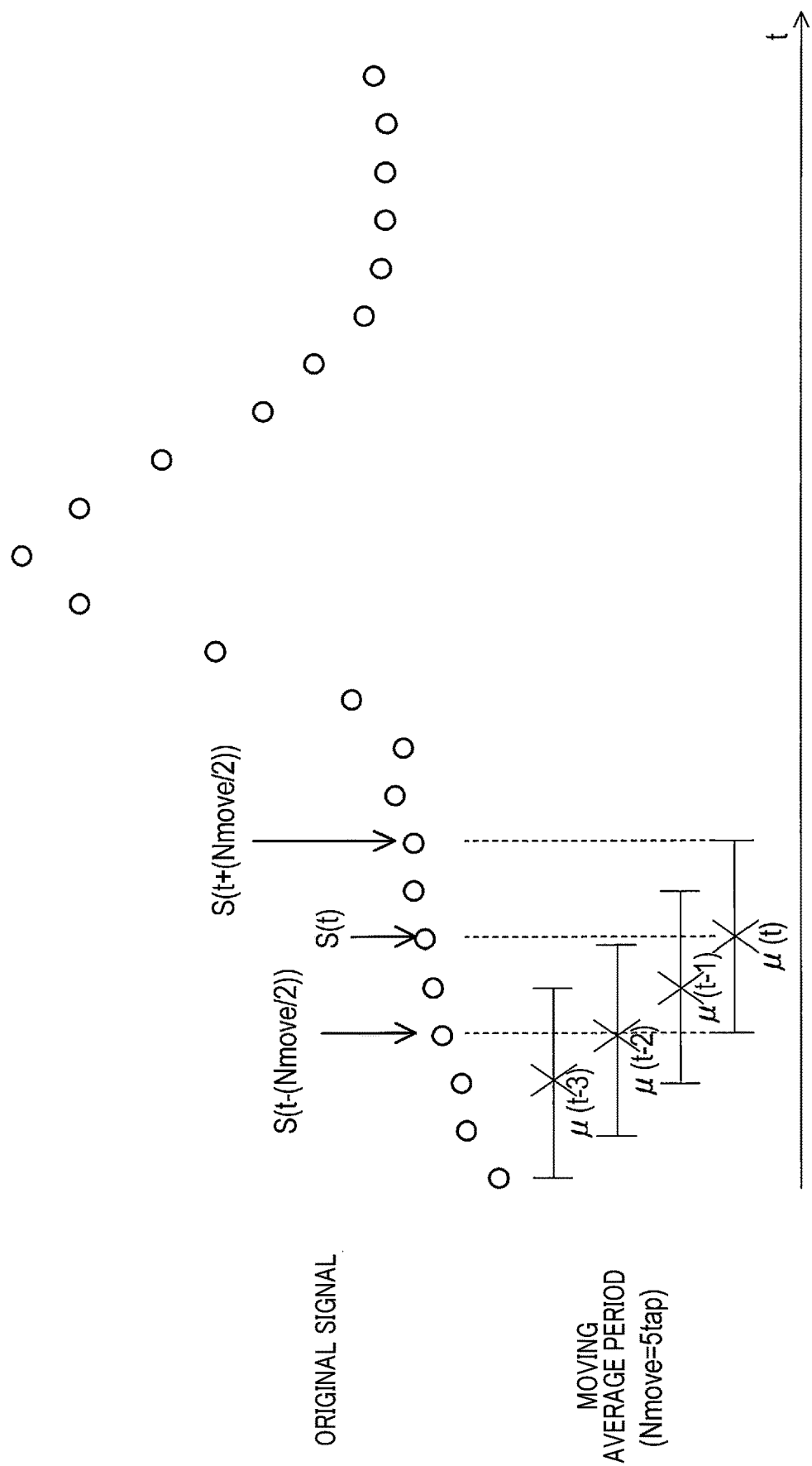
FIG. 11 is an explanatory diagram showing a phase-shift of the moving average value with respect to the input signal.

As shown in FIG. 11, in the case where a calculation object of the moving average value μ (t) is set to be a range from the measurement signal S (t−Nmove/2) to the measurement signal S (t+Nmove/2) with respect to the measurement signal S(t) as the center of the range, the phase of the moving average μ (t) corresponds to the phase of the measurement signal S (t). However, as calculated at step S120, when the Nmove-measurement signals S prior to S (t) is determined as a calculation object, the phase of the moving average value μ (t) is shifted to past-time side by a period corresponding to Nmove/2 pcs of data points with respect to the phase of the measurement signal S (t). Therefore, subtracting the moving average μ (t) from the measurement signal S (t) without adjusting the phase relationship between the measurement signal S (t) and the moving average μ (t) corresponds to subtracting μ (t−2) from S (t) of an example shown in FIG. 11. Moreover, the baseline may be changed in a period of Nmove/2. Hence, when the moving average μ (t) is subtracted from the measurement signal S (t), the correction accuracy of the baseline may be degraded.

Accordingly, the processing unit 33 adjusts the phase relationship (i.e. time relationship) between the measurement signal S (t) and the moving average μ (t). Then, the moving average value μ (t) is subtracted from the measurement signal S (t−Nmove/2) in which the phase relationship is adjusted, thereby calculating the correction signal D (t−Nmove/2). A period acquiring a measurement signal S (t) of Nmove/2 which is half of the moving average number Nmove corresponds to an adjustment period. The adjustment period my preferably be a period for acquiring Nmove/2 measurement signal S (t). However, the adjustment period may be set to be substantially the same as a period for acquiring the Nmove/2 measurement signal S (t).

Subsequently, at step S150, the processing unit 33 determines whether the D (t−Nmove/2) is the last item of data. The processing unit 33 proceeds to step S160 if the D (t−Nmove/2) is not the last data, and updates the acquiring position t to be t+1. Thereafter, the process returns to step S110.

Figure 12:
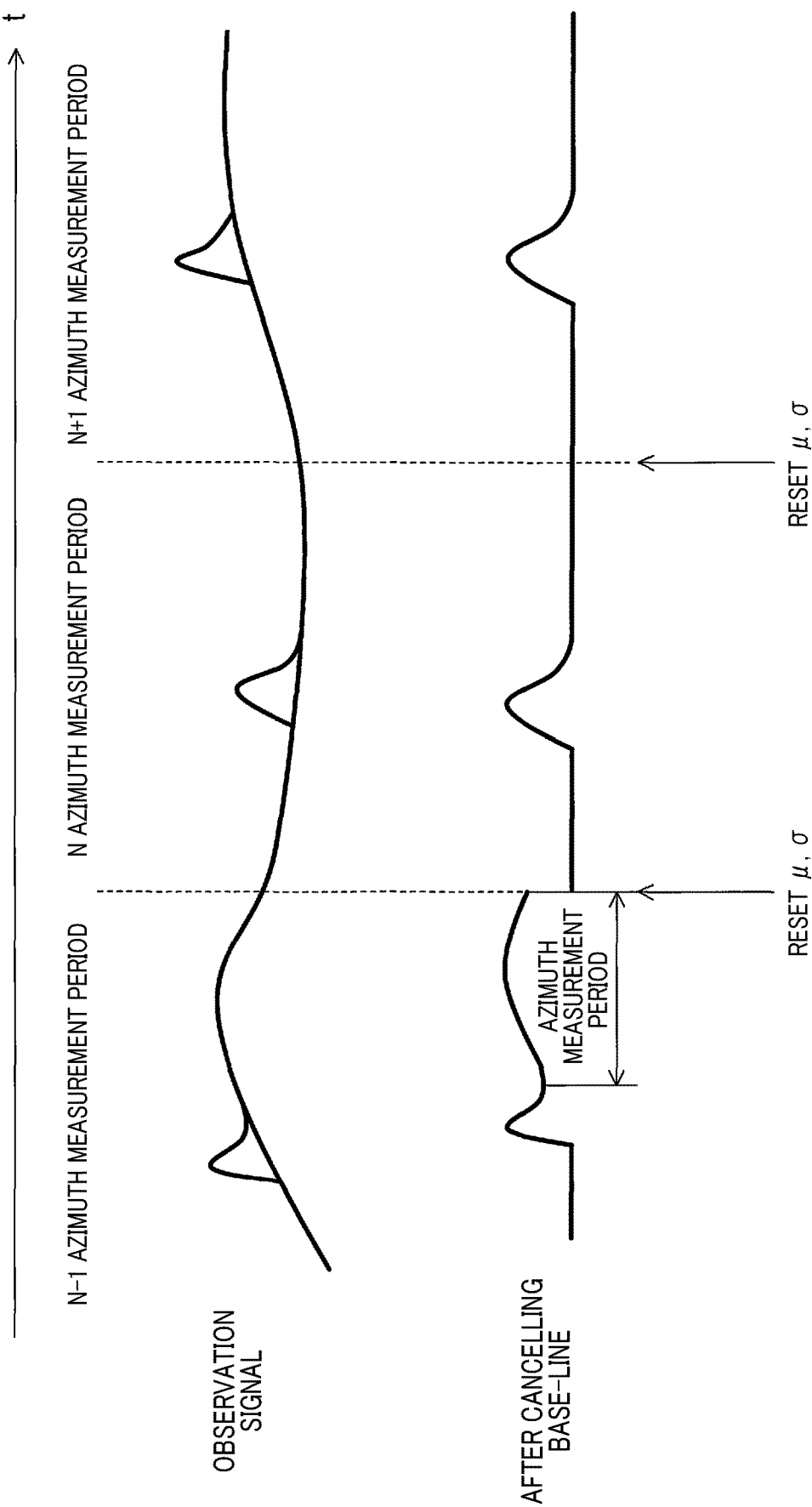
FIG. 12 is an explanatory diagram showing a state where the moving average value and the noise value are reset at each measurement completion timing for a single azimuth.

On the other hand, the processing unit 33 terminates the process if the D (t−Nmove/2) is the last item of data. Thus, a measurement for a single azimuth is completed. The processing unit 33 resets the calculated moving average value μ and the noise value σ when each single-azimuth measurement is completed. Thus, as shown in FIG. 12, even in a case where unexpected noise is mixed in during the calculation of the moving average value μ in an N−1th azimuth measurement to cause an abnormal value in the moving average value, the moving average value μ is not affected by the abnormal value in measurements after the Nth azimuth measurement.

<1-4. Effects and Advantages>

According to the above-described first embodiment, the following effects and advantages can be obtained.

(1) The calculation object of the moving average value is determined using the calculation threshold Thb which is set based on the noise value σ. Further, the number of data used for calculating the noise value σ and the number of data used for calculating the moving average value μ are independently set. Hence, an accurate baseline is calculated, whereby the baseline correction can be achieved.

(2) The accuracy of the noise value σ calculated by a statistical process becomes higher as the number of data of the measurement signal S used for the calculation increases. On the other hand, for the moving average value μ, the trackability for the variation of the baseline decreases as the number of data of the measurement signal S used for the calculation increases. Thus, the calculation number Nnoise is set to be larger than the moving average number Nmove, whereby the trackability of the baseline correction with respect to the variation of the baseline can be higher, while ensuring the calculation accuracy of the noise value σ.

(3) The time of the measurement signal S with respect to the time of the moving average value μ is shifted by a period corresponding to Nmove/2 pcs of data points and the moving average value μ is subtracted from the measurement signal S, whereby the baseline can be corrected accurately.

(4) The measurement signal S in the prior period immediately before the baseline non calculation period is not determined as a calculation object of the moving average value μ, thereby suppressing occurrence of an undershoot on the post-correction signal D in the prior period.

(5) The measurement signal S in the latter period immediately after the baseline non calculation period is not determined as a calculation object of the moving average value μ, thereby suppressing occurrence of an undershot on the post-correction signal D in the latter period.

(6) The moving average value μ and the noise value σ are reset when each single azimuth measurement is completed. Thus, even in a case where unexpected noise is mixed into the measurement signal S in the current azimuth measurement, causing an abnormal value on the calculated moving average value μ and the noise value σ, in the later azimuth measurement, the calculation for the moving average value μ and the noise value σ can be prevented from being affected by the abnormal value. Further, the abnormal values of the moving average value μ and the noise value σ in the current azimuth measurement can be prevented from affecting the accuracy of the baseline correction in latter azimuth measurements.

Second Embodiment

<2-1. Difference from the First Embodiment>

The second embodiment is similar to the first embodiment in the fundamental configuration. Hence, explanation for the common configuration is omitted and different configurations will mainly be described. The reference numbers same as those in the first embodiment represent the same configuration as those in the first embodiment to which the preceding explanation will be applied.

Figure 13:
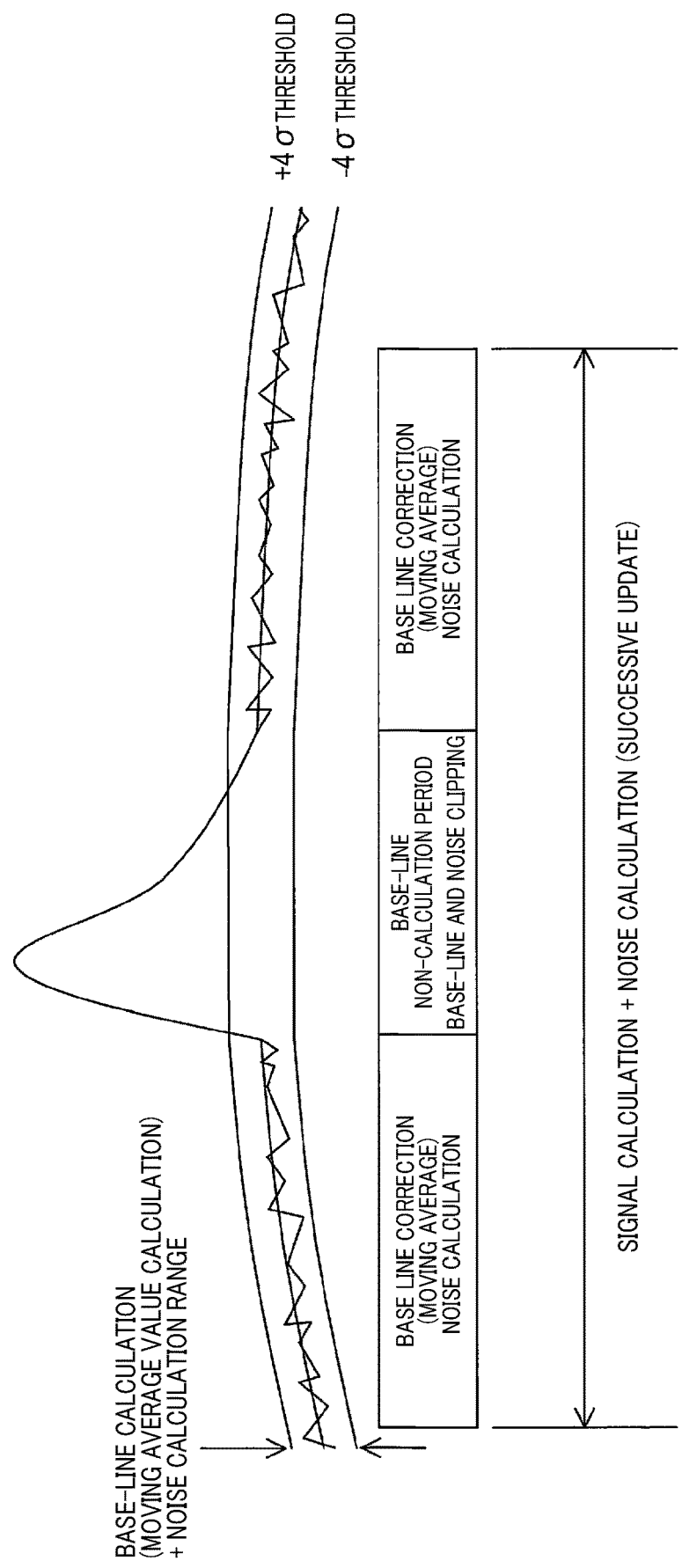
FIG. 13 is a calculation period of a noise and a reflection signal, and a calculation range to be calculated of a baseline and a noise value according to a second embodiment.

According to the above-described first embodiment, a first predetermined period of in the acquiring period for a single azimuth is determined as a noise calculation period, and the rest of period is determined as a signal calculation period, in which the noise value σ is fixed. As shown in FIG. 13, the second embodiment differs from the first embodiment in that the entire acquiring period for the single azimuth is determined as a signal calculation period, and the noise value σ is successively updated.

<2-2. Noise Calculation Process and Baseline Correction Process>

Next, the noise calculation process and the baseline correction process executed by the processing unit 33 in the second embodiment will be described with reference to a flowchart shown in FIG. 14. The processing unit 33 starts the present process every time when the single azimuth measurement is completed. The processing unit 33 executes a process corresponding to flowcharts shown in FIGS. 6 and 7.

At steps S200 to S240, the processing unit 33 executes processes similar to step S100 to S140.

Subsequently, at steps S250 to S280, the processing unit 33 executes processes similar to steps S20 to S40 and S70.

Next, at step S290 and S300, the processing unit 33 executes processes similar to steps S150 and S160. Then, the present process is terminated. Thus, a measurement of the single azimuth is completed. The processing unit 33 resets the calculated moving average value μ and the noise value μ when each single-azimuth measurement is completed.

<2-3. Effects and Advantages>

According to the above-described second embodiment, effects and advantages similar to the above-described effects and advantages (1) to (6) of the first embodiment can be obtained.

Third Embodiment

The third embodiment is similar to the first embodiment in the fundamental configuration. Hence, explanation for the common configuration is omitted and different configurations will mainly be described. The reference numbers same as those in the first embodiment represent the same configuration as those in the first embodiment to which the preceding explanation will be applied.

<3-1. Difference from the First Embodiment>

According to the above-described first embodiment, the moving average value μ in the non-calculation period of the baseline is fixed.

The third embodiment differs from the first embodiment in that the moving average value μ in the non-calculation period is estimated by the moving average value μ calculated immediately before the non-calculation period and the differential value of the moving average value μ.

According to the present embodiment, the processing unit 33 achieves respective functions of an input unit, a noise calculation unit, a calculation threshold setting unit, a period determination unit, a moving average calculation unit, a moving average estimation unit, an updating unit, a memory unit, and a resetting unit.

<3-2. Baseline Correction Process>

Next, the baseline correction process executed by the processing unit 33 in the third embodiment will be described with reference to a flowchart shown in FIG. 15. In the third embodiment, the noise calculation process executed by the processing unit 33 is the same as that of the flowchart shown in FIG. 6. The processing unit 33 starts a process of the flowchart shown in FIG. 15 after completing the process of the flowchart shown in FIG. 6.

At steps S400 to S420, the processing unit 33 performs processes similar to those of steps S100 to S120.

Subsequently, at step S430, the processing unit 33 determines whether the level of difference between the moving average value μ (t) and the measurement signal S (t) continues to be larger than the calculation threshold Thb for P times or more. That is, at step S410, it is determined whether affirmative determination is continuously detected for P times or more.

Figure 16:
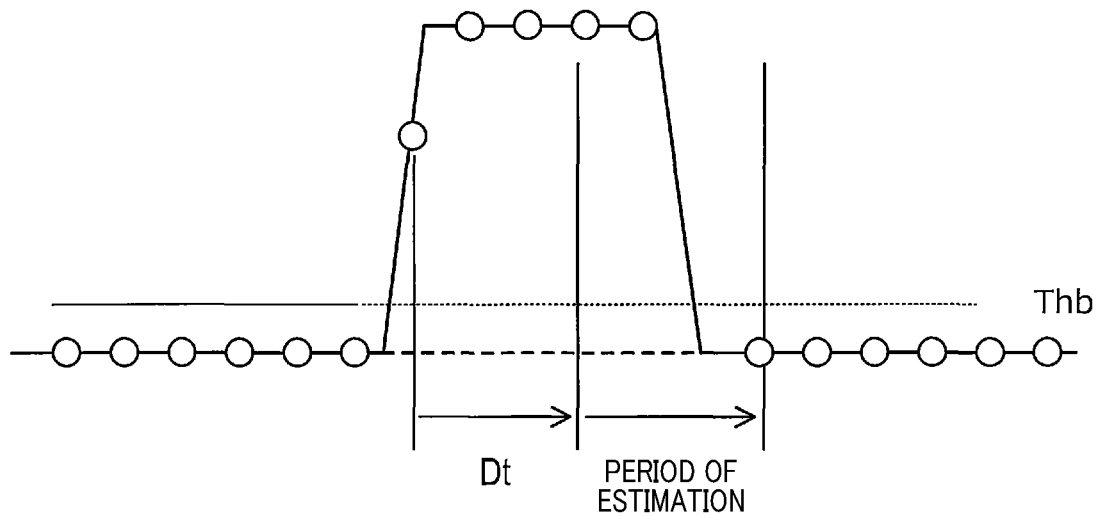
FIG. 16 is an explanatory diagram showing a section where the moving average value is predicted during a non-calculation period of a baseline.
Figure 17:
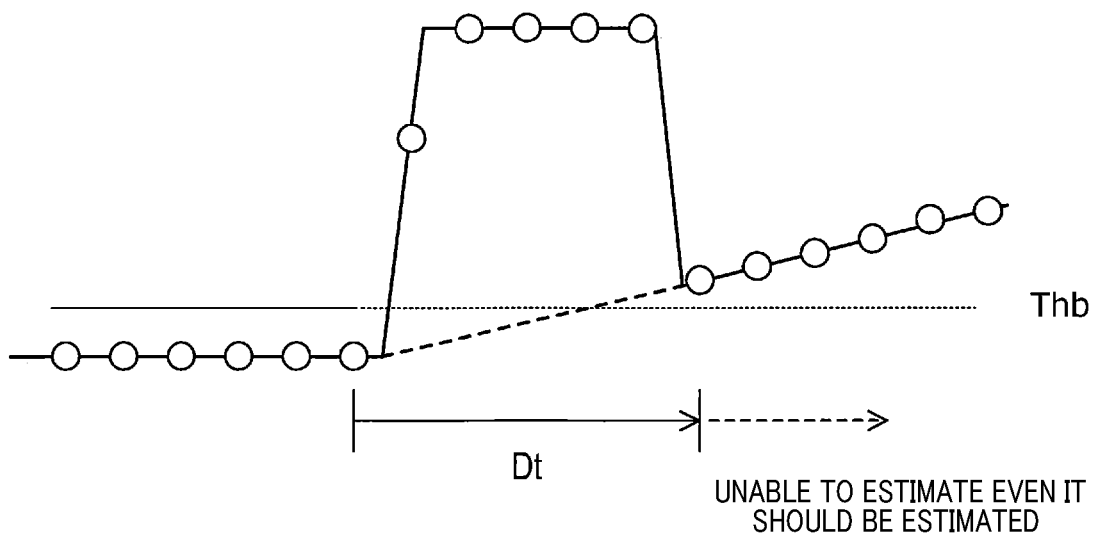
FIG. 17 is an explanatory diagram showing a state where a significant change in the baseline during the non-calculation period of the baseline causes an unpredictable baseline after the non-calculation period.

FIGS. 16 and 17 show explanatory diagrams for determining the number of determinations P. As shown in FIG. 17, in the case where the length Dt of the non-calculation period of the baseline is relatively large, the baseline in the non-calculation period varies and the level of difference between the moving average value μ and the measurement signal S possibly exceeds the calculation threshold Thb after completing the non-calculation period. In this case, the moving average value μ cannot be calculated after completing the non-calculation period. Moreover, the baseline correction cannot be performed after completing the non-calculation period.

Therefore, a section where the level of the baseline is less than the calculation threshold is calculated, based on the slope of the baseline immediately before start time of the non-calculation period, that is, the differential value of the moving average value μ, and the number of data points corresponds to the number of determinations P is set. Specifically, assuming that the slope of the moving average value μ immediately before the start time of the non-calculation period is determined as A, the number of data points within the length Dt that satisfies A×Dt<Thb is determined as P. In other words, P is set to be a value in which Dt=Thb/A is divided by the sampling interval.

The processing unit 33 proceeds to step S440 when the number of events where the level of difference exceeds the calculation threshold Thb is less than P times. At step S440, the processing unit 33 executes a process similar to that of step S130.

On the other hand, the processing unit 33 proceeds to step S450, when the number of events where the level of difference exceeds the calculation threshold Thb is P times or larger. At step S450, the processing unit 33 determines the moving average value μ (t) at the acquiring position t to be a value where an average value of the differential value of the moving average value μ immediately before the non-calculation period is added to the moving average value μ (t−1) at one cycle before acquiring position (t−1). The average value of the differential value to be added can be calculated using the array P stored at step S419, based on the equation {(P[1]−P[0]+(P[2]−P[1])+ . . . +(P[Nmove-1]−P[Nmove-2])}/Nmove.

Subsequently, at steps S460 to S480, the processing unit 33 executes processes similar to steps S140 to S160. Then, the present process is terminated. Thus, a measurement of the single azimuth is completed. Similar to the first embodiment, the processing unit 33 resets the calculated moving average value μ and the noise value μ when each single-azimuth measurement is completed.

Figure 18:
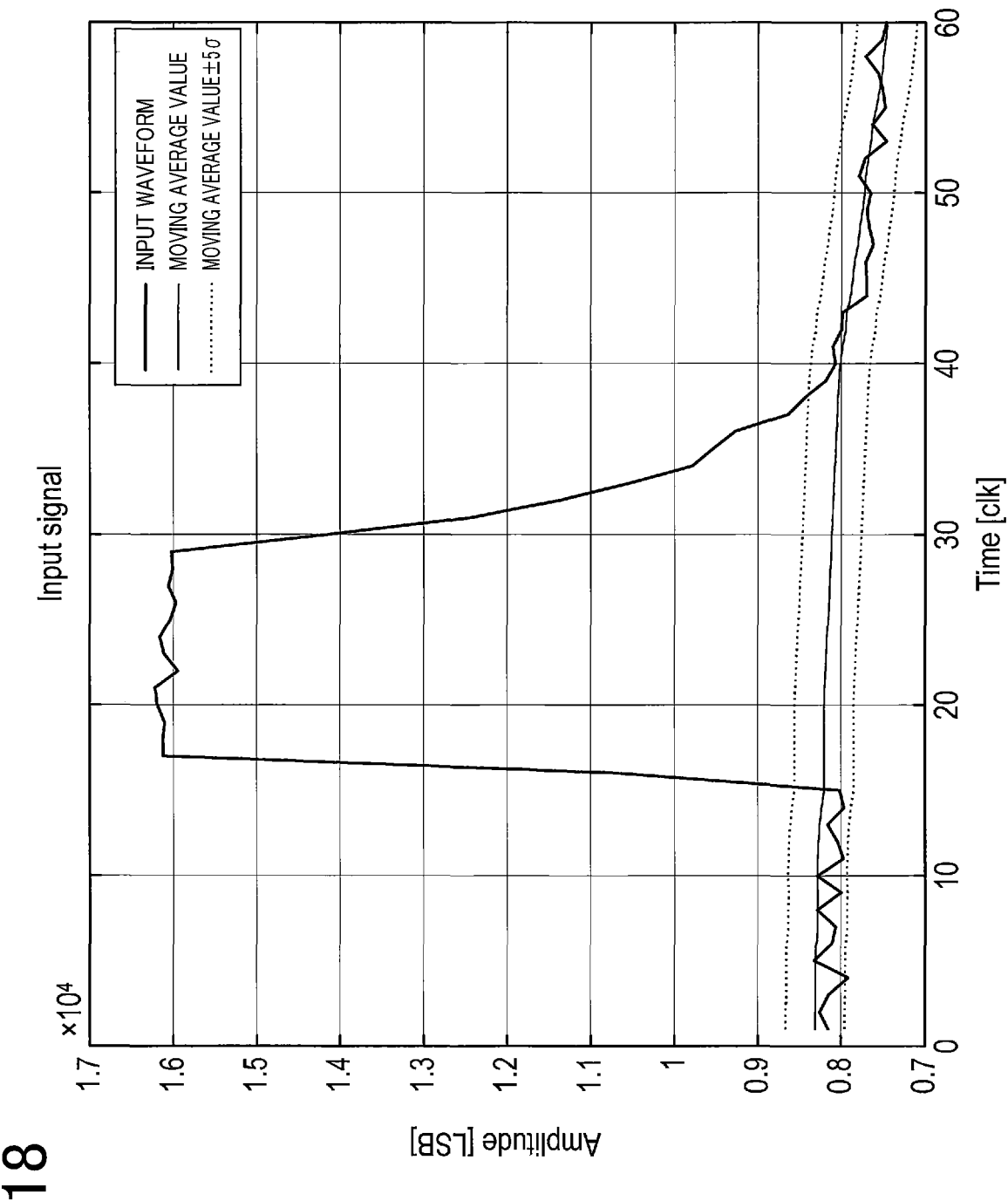
FIG. 18 is a diagram showing a waveform of the measurement signal, a moving average value and a calculation threshold in the case where the moving average value is predicted during the non-calculation period.

FIG. 18 shows a waveform of a measurement signal S, a moving average value μ and a calculation threshold Thb when the moving average value in the non-calculation period of the baseline is estimated. Here, the calculation threshold Thb is set to be 5σ. As shown in FIG. 18, even in the case where the non-calculation period is relative long and the baseline varies in the non-calculation period, the baseline in the non-calculation period is calculated, whereby the baseline after the non-calculation period can be accurately calculated.

<3-3. Effects and Advantages>

According to the above-described third embodiment, effects and advantages similar to the above-described effects and advantages (1) to (6) of the first embodiment can be obtained.

(7) The differential value of the moving average value μ immediately before the non-calculation period of the baseline is used to calculate the moving average value μ in the non-calculation period including the initial value of the moving average value μ after the non-calculation period. Therefore, even in a case where the baseline varies in the non-calculation period, accurate baseline correction can be achieved.

Fourth Embodiment

<4-1. Differences from the First to Third Embodiments>

According to the first to third embodiments, the calculation threshold Thb is used to merely determine whether the data is an baseline calculation object. In contrast, according to the fourth embodiment, a signal threshold Thr is newly implemented in which the post-correction signal D and the signal threshold Thr are compared, and when the post-correction signal D exceeds the signal threshold Thr, it is determined as a reflected signal.

According to the present embodiment, the processing unit 33 achieves functions of the signal threshold generation unit and the signal determination unit. The signal threshold generation unit generates the signal threshold Thr so as to satisfy the relationship: signal threshold Thr≥calculation threshold Thb. For the signal threshold Thr, when the calculation threshold Thb is 4σ, the signal threshold Thr is generated being determined as 5σ. The signal threshold Thr and the calculation threshold Thb can be independently set. The calculation threshold Thb is set to be 4σ and the signal threshold Thr is set to be 5σ, whereby erroneous detection of the reflected signal can be avoided in the case where a correction error occurs on the post-correction signal D caused by an undershoot or an overshoot.

<4-2. Baseline Correction Process>

Figure 19:
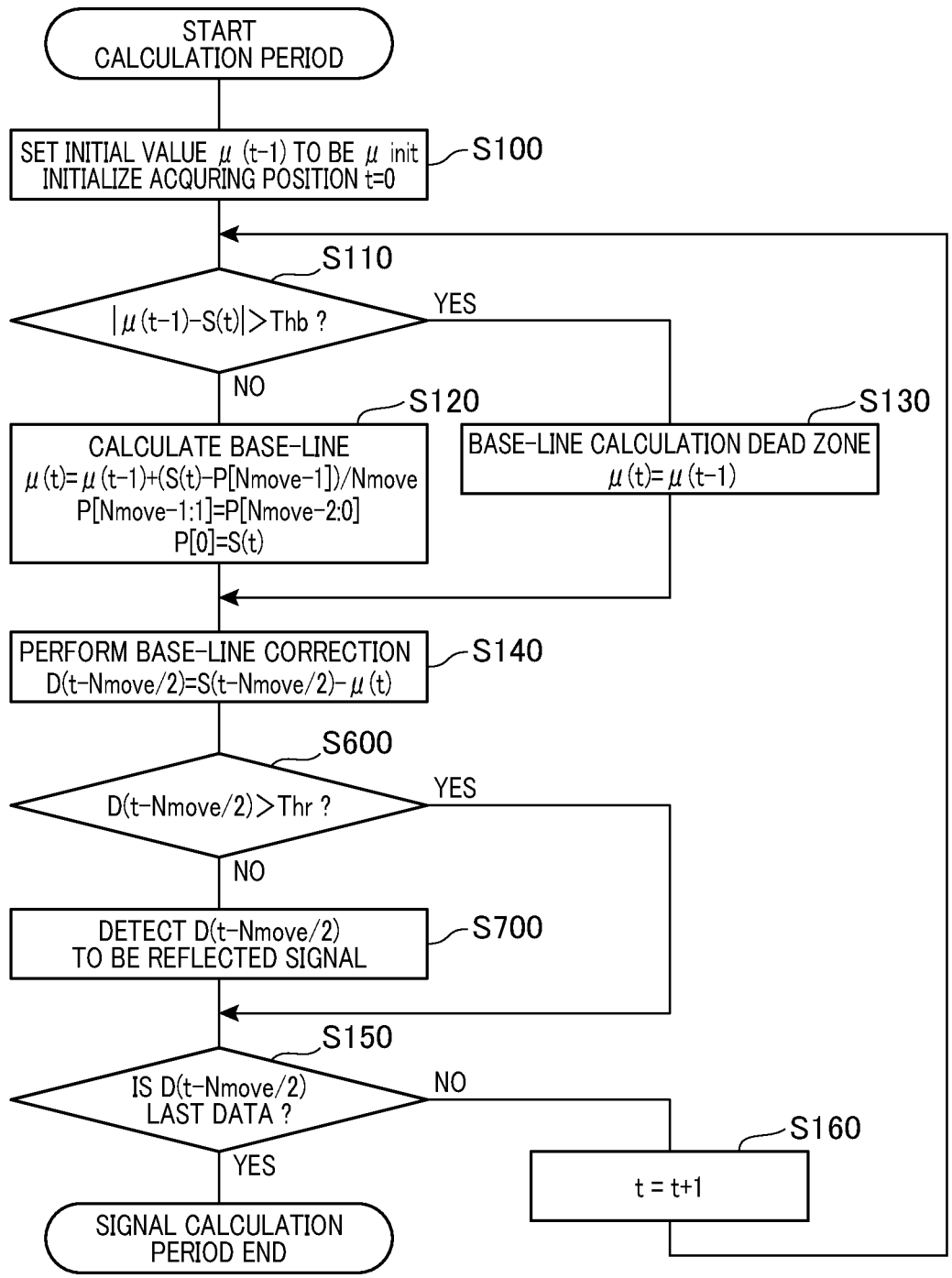
FIG. 19 is a flowchart showing a procedure of a baseline correction process according to a fourth embodiment.

Next, the baseline correction process executed by the processing unit 33 in the fourth embodiment will be described with reference to a flowchart shown in FIG. 19. In the fourth embodiment, the noise calculation process executed by the processing unit 33 is the same as that of the flowchart shown in FIG. 6. The processing unit 33 starts a process of the flowchart shown in FIG. 19 after completing the process of the flowchart shown in FIG. 6.

Figure 7:
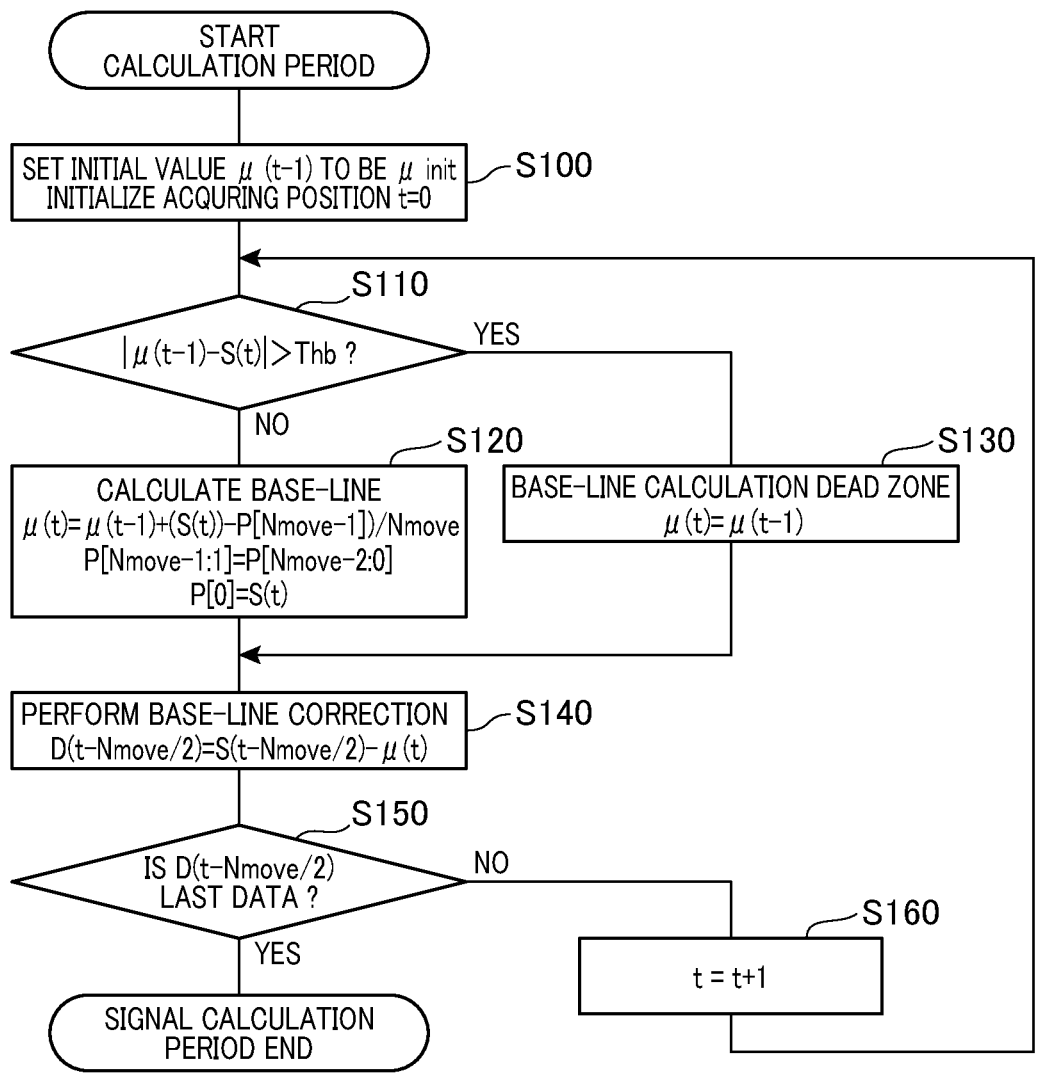
FIG. 7 is a flowchart showing a process of a baseline correction process according to the first embodiment.

At steps S100 to S160, the processing unit 33 executes processes similar to those of steps S100 to S160 in the flowchart shown in FIG. 7. Then, the processing unit 33 executes processes of steps S600 and S700 between the step S140 and step S150.

At step S600, the processing unit 33 determines whether the post-correction signal D (t−Nmove/2) is larger than the signal threshold Thr. When the post-correction signal D (t−Nmove/2) is less than or equal to the signal threshold Thr, the signal processing unit 33 proceeds to step S150.

On the other hand, in the case where the post-correction signal D (t−Nmove/2) is larger than the signal threshold Thr, the processing unit 33 proceeds to step S700. At step S700, the processing unit 33 detects the post-correction signal D (t−Nmove/2) to be the reflected signal and proceeds to step S150.

<4-3. First Modification>

Figure 20:
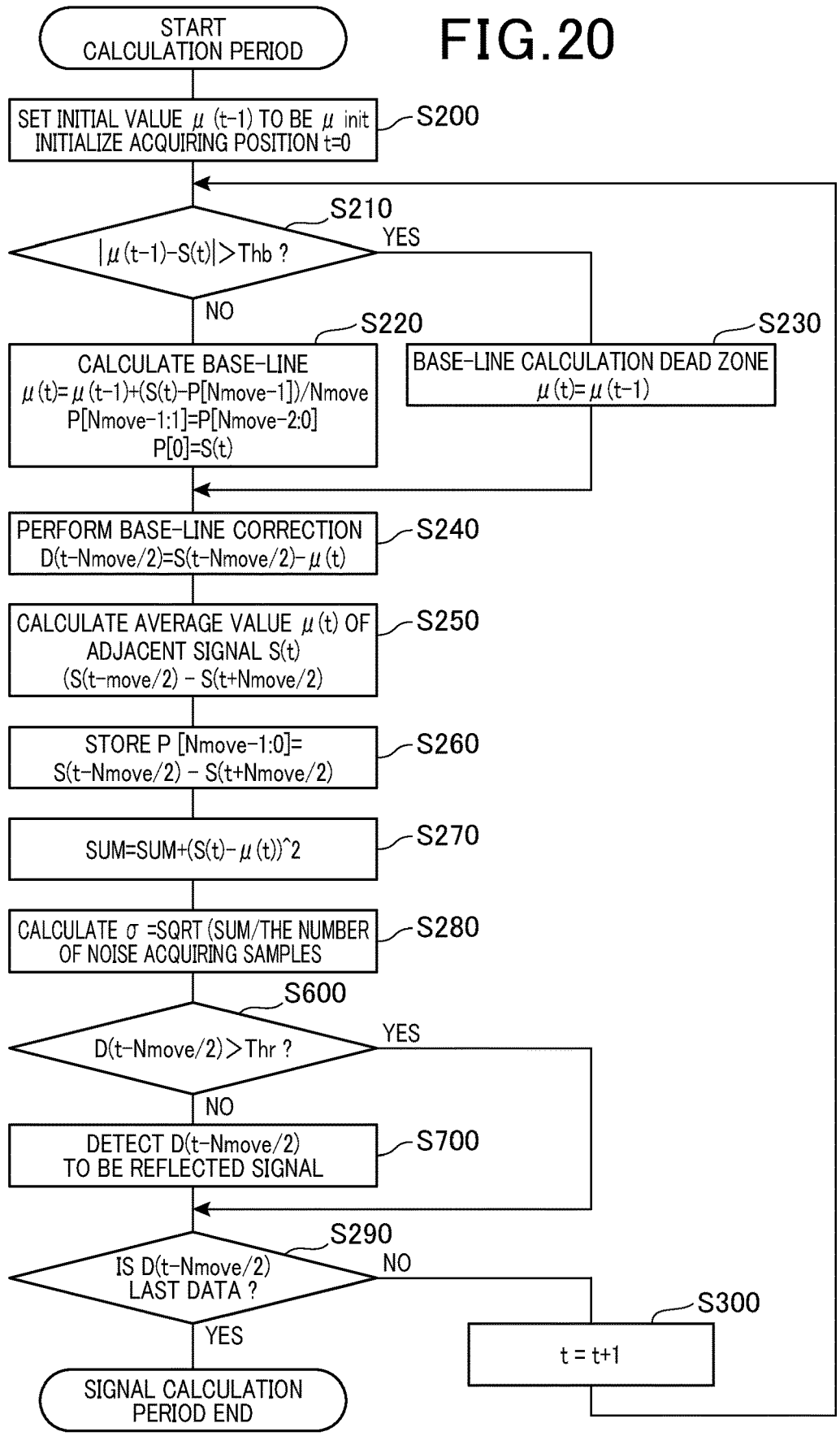
FIG. 20 is a flowchart showing a procedure of a noise calculation process and a baseline correction process according to a first modification example of the fourth embodiment.

Next, the noise calculation process and the baseline correction process executed by the processing unit 33 in the modification example of the fourth embodiment will be described with reference to a flowchart shown in FIG. 20.

Figure 14:
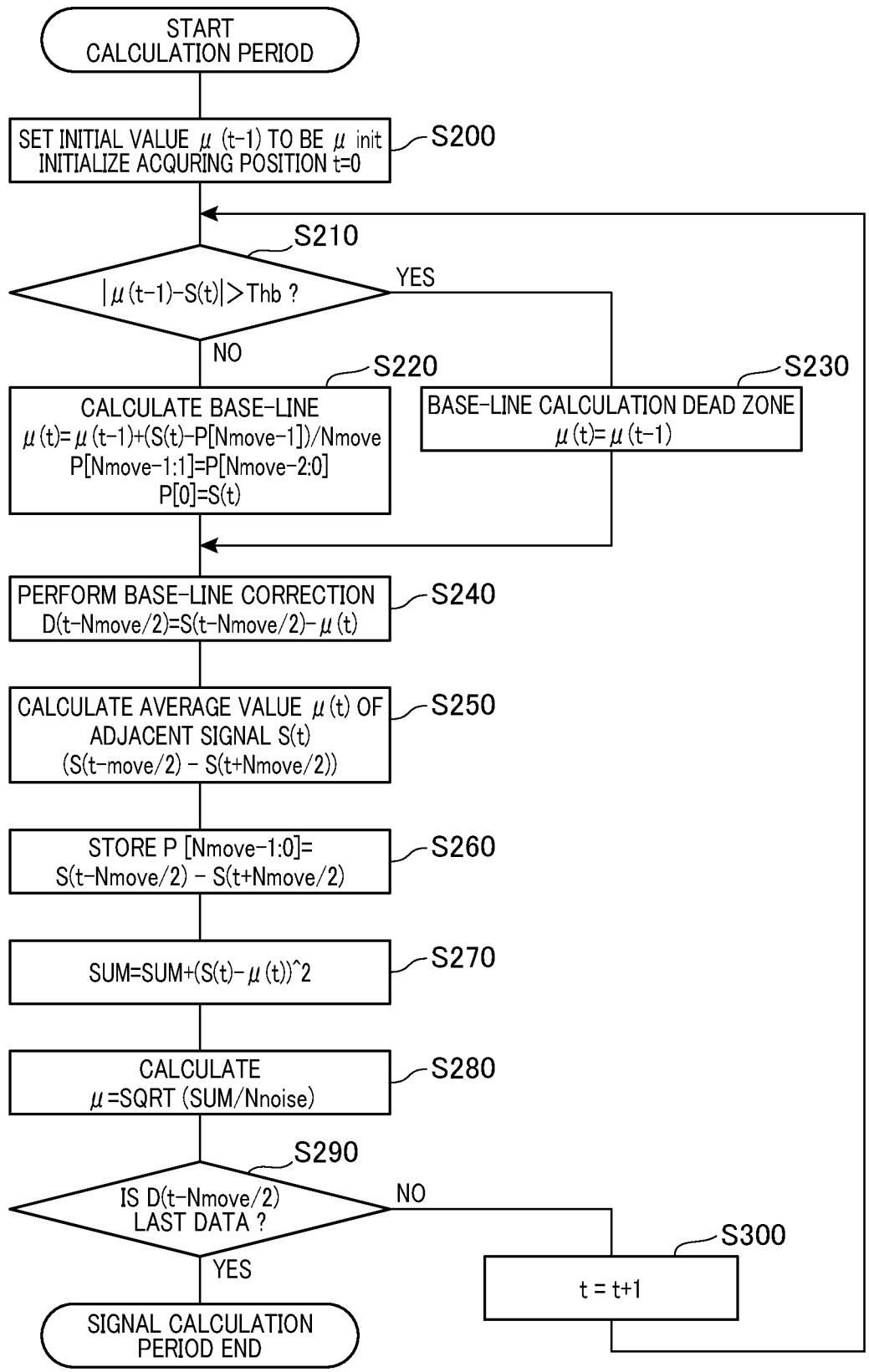
FIG. 14 is a flowchart showing a procedure of a noise calculation process and a baseline correction process according to the second embodiment.

At steps S200 to S300, the processing unit 33 executes processes similar to those of steps S200 to S300 in the flowchart shown in FIG. 14. Then, the processing unit 33 executes processes of steps S600 and S700 in the flow chart shown in FIG. 19 between the step S280 and step S290.

<4-4. Second Modification>

Figure 21:
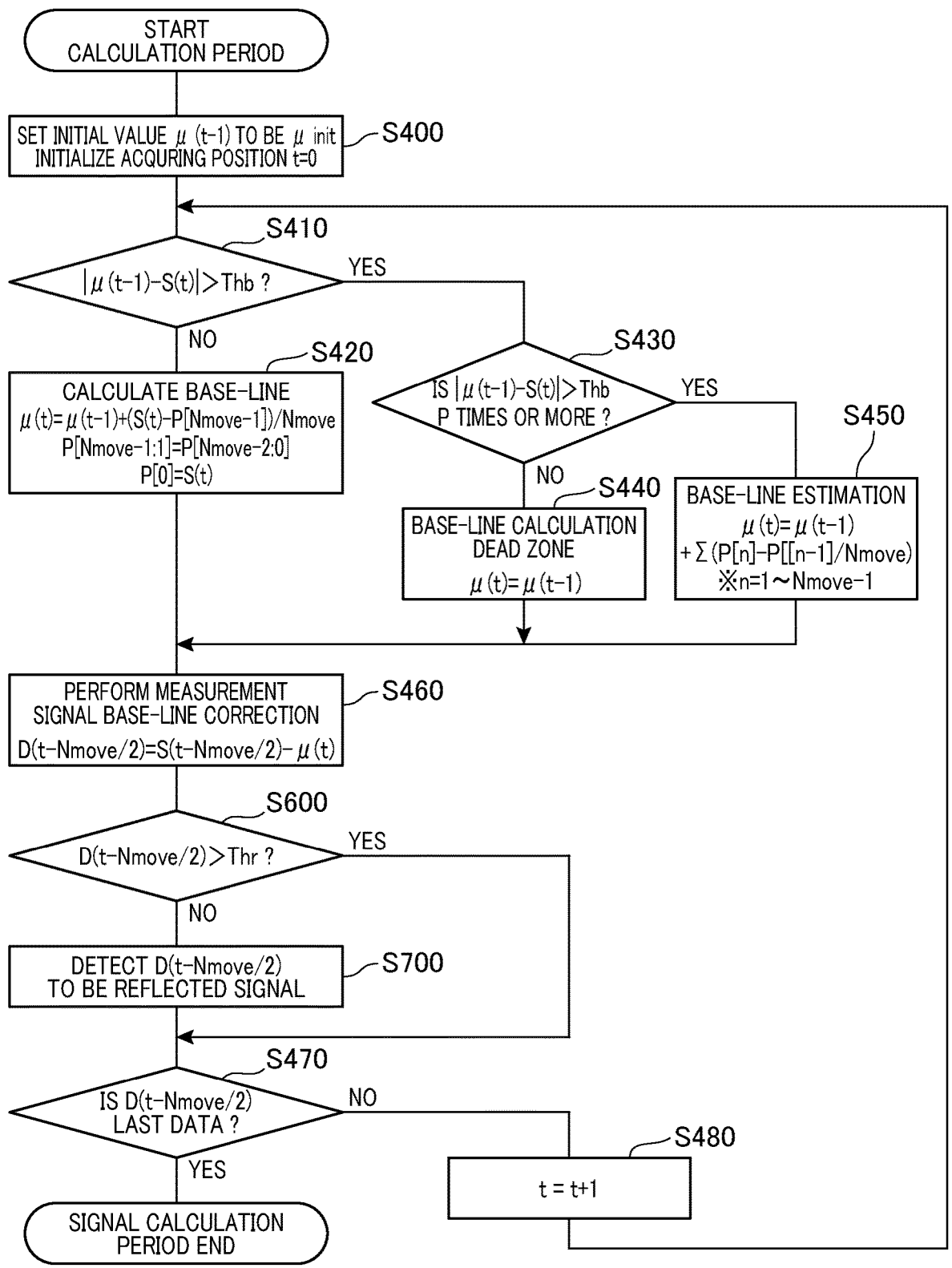
FIG. 21 is a flowchart showing a procedure of a baseline correction process according to a second modification of the fourth embodiment.

Next, the baseline correction process executed by the processing unit 33 in the modification example of the fourth embodiment will be described with reference to a flowchart shown in FIG. 21. The noise calculation process executed by the processing unit 33 in the second modification example of the fourth embodiment is the same as the process in the flowchart shown in FIG. 6. The processing unit 33 starts a process of the flowchart shown in FIG. 21 after completing the process of the flowchart shown in FIG. 6.

Figure 15:
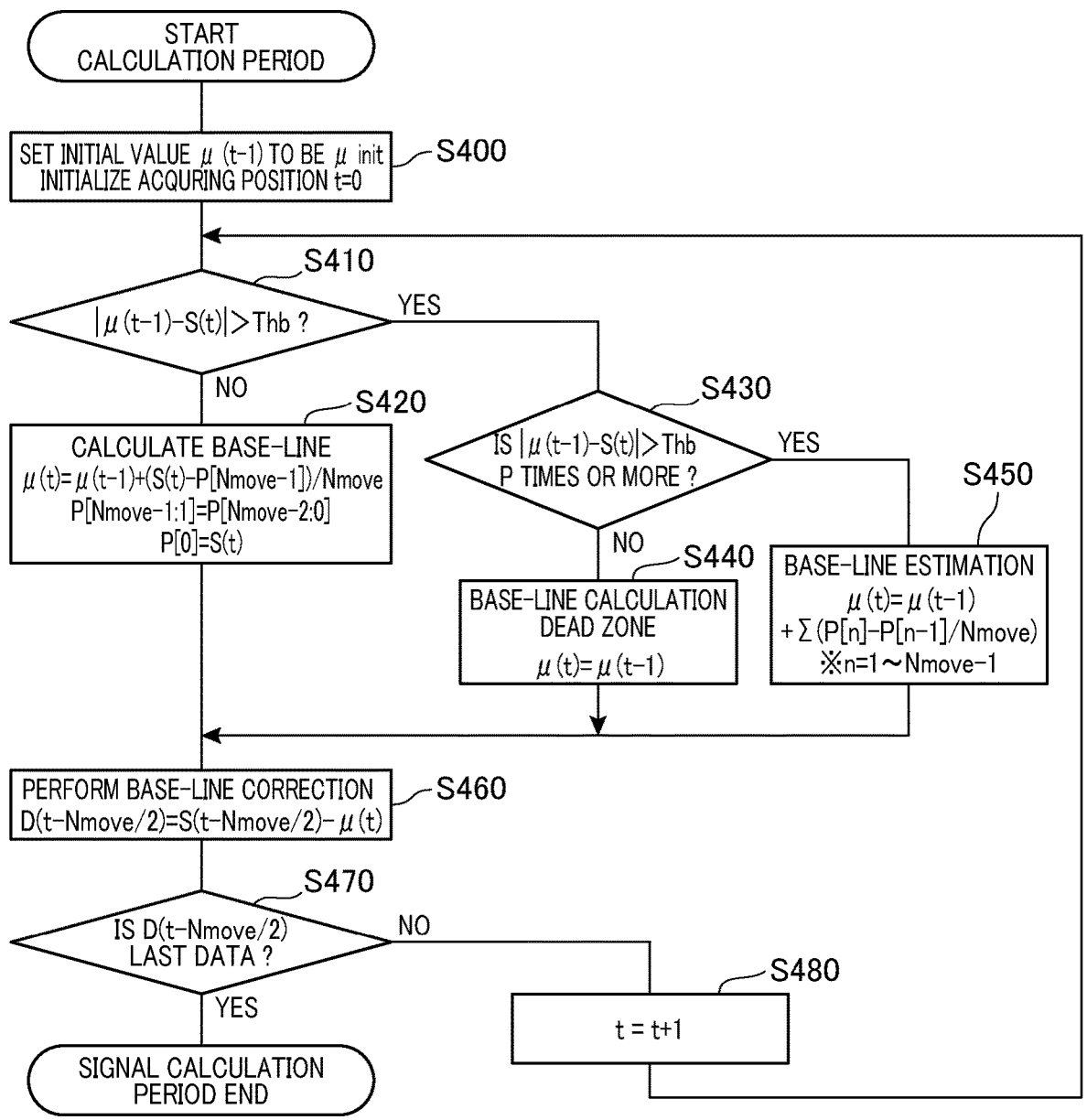
FIG. 15 is a flowchart showing a procedure of a baseline correction process according to a third embodiment.

At steps S400 to S480, the processing unit 33 executes processes similar to those of steps S400 to S480 in the flowchart shown in FIG. 15. Then, the processing unit 33 executes processes of steps S600 and S700 in the flow chart shown in FIG. 19 between the step S460 and step S470.

According to the above-described fourth embodiment, the following effects and advantages can be obtained in addition to the effects and advantages similar to the above-described effects and advantages (1) to (7) of the first to third embodiments.

(8) The post-correction signal D and the signal threshold Thr are compared, whereby the reflected signal can be detected from the post-correction signal D. Moreover, the detected reflected signal is used, whereby the distance to the object that reflects the laser light can be calculated.

(9) The signal threshold Thr is set to be larger than or equal to the calculation threshold Thb, whereby erroneous detection of the reflected signal can be suppressed even when a correction error occurs on the post-correction signal D caused by an undershoot or an overshoot.

Other Embodiments

Embodiments of the present disclosure is described so far. The present disclosure is not limited to the above-described embodiments but may be modified in various manners.

(a) According to the present embodiments, the laser radar apparatus 1 is used as a signal processing apparatus. However, the present disclosure is not limited to this configuration. For the signal processing unit, any apparatuses capable of processing the measurement signal can be utilized. Specifically, the signal processing apparatus according to the present disclosure is suitable for apparatuses of which the background signal is likely to vary, such as a radiation measuring apparatus, medical equipment, a copying machine and the like.

(b) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

(c) The present disclosure can be achieved by various modes other than the above-described signal processing apparatus, such as a system including the signal processing apparatus as a constituent, a signal processing method and the like.

CONCLUSION

One aspect of the present disclosure is a signal processing unit provided with an input unit, a noise calculation unit, a calculation threshold setting unit, a period determination unit, a moving average calculation unit, an updating unit and a memory unit. The input unit is configured to input a measurement signal. The noise calculation unit is configured to apply a statistical process to the measurement signal having the number of data as a first number of data, inputted to the input unit to calculate a noise value indicating a variation of the measurement signal. The calculation threshold setting unit is configured to set, based on the noise value calculated by the noise calculation unit, a calculation threshold used for determining a non-calculation period of a baseline. The period determination unit is configured to determine a period where a difference between the measurement signal inputted to the input unit and a moving average value calculated in a previous cycle exceeds the calculation threshold set by the calculation threshold setting unit, to be the non-calculation period. The moving average calculation unit is configured such that the measurement signal is moving-averaged for each second number of data in a period excluding the non-calculation period determined by the period determination unit to calculate the moving average value and the moving average value calculated immediately before the non-calculation period is calculated in the non-calculation period to be the moving average value. The updating unit is configured to update the measurement signal inputted to the input unit to be a value in which the moving average value currently calculated by the moving average calculation unit is subtracted from the measurement signal. The memory unit is configured to store the measurement signal updated by the updating unit. The first number of data and the second number of data are set independently.

According to the one aspect of the present disclosure, a statistical process is applied to the first number of data of the measurement signal to calculate the noise value, and the calculation threshold is set based on the calculated noise value. With the calculation threshold, the non-calculation period of the baseline is determined and the measurement signal which is calculation object of the moving average value is determined. Then, the moving average value is calculated from the calculation object of the determined moving average value, and the measurement signal is updated to be a value in which the calculated moving average value is subtracted from the measurement signal. Further, the first number of data of the measurement signal used for calculating the noise value and the second number of data of the measurement signal used for calculating the moving average value are independently set.

In other words, the calculation object of the moving average value is determined with the calculation threshold set based on the noise value, and the first number of data and the second number of data are independently set. Hence, accurate baseline correction can be achieved.

Another aspect of the present disclosure is a signal processing unit provided with an input unit, a noise calculation unit, a calculation threshold setting unit, a period determination unit, a moving average calculation unit, a differential calculation unit and a moving average estimating unit. The input unit is configured to input a measurement signal. The noise calculation unit is configured to apply a statistical process to the measurement signal having the number of data as a first number of data, inputted to the input unit to calculate a noise value indicating a variation of the measurement signal. The non-calculation determination unit is configured to determine a period where a difference between the measurement signal inputted to the input unit and a moving average value calculated in a previous cycle exceeds the calculation threshold set by the calculation threshold setting unit, to be the non-calculation period. The moving average calculation unit is configured such that the measurement signal in a period excluding the non-calculation period determined by the period determination unit is moving-averaged for each second number of data to calculate the moving average value. The differential calculation unit is configured to calculate a differential value of the moving average value calculated by the moving average calculation unit. The moving average estimation unit is configured to estimate the moving average value in the non-calculation period in accordance with the differential value calculated immediately before the non-calculation period by the differential calculation unit and the moving average value calculated immediately before the non-calculation period by the moving average calculation unit. The moving average value in the non-calculation period includes an initial value used for the moving average calculation unit to calculate the moving average value after the non-calculation period. The updating unit is configured to update the measurement signal inputted to the input unit to be a value in which the moving average value currently calculated or estimated by the moving average calculation unit or the moving average estimation unit is subtracted from the measurement signal. The memory unit is configured to store the measurement signal updated by the updating unit. The first number of data and the second number of data are set independently.

According to the one aspect of the present disclosure, a statistical process is applied to the first number of data of the measurement signal to calculate the noise value, and the calculation threshold is set based on the calculated noise value. With the calculation threshold, the non-calculation period of the baseline is determined and the measurement signal which is calculation object of the moving average value is determined. Then, the moving average value in a period excluding the non-calculation period is calculated from the calculation object of the determined moving average value. Further, a differential value of the calculated moving average value is calculated and the moving average value in the non-calculation period is estimated in accordance with the calculated differential value and the moving average value immediately before the non-calculation period. The estimated moving average value in the non-calculation period includes an initial value of the moving average value after the non-calculation period. In other words, the moving average value after the non-calculation period is calculated as an initial value of the estimated moving average value in the non-calculation period. Then, the measurement signal is updated to be a value in which the calculated or estimated moving average value is subtracted from the measurement signal. Further, the first number of data of the measurement signal used for calculating the noise value and the second number of data of the measurement signal used for calculating the moving average value are independently set.

In other words, the calculation object of the moving average value is determined with the calculation threshold set based on the noise value, and the first number of data and the second number of data are independently set. Further, even in a case where the baseline is likely to vary when the non-calculation period is relatively long, the moving average value in the non-calculation period including the initial value of the moving average value after the non-calculation period is calculated by using the differential value of the moving average value immediately before the non-calculation period. Hence, accurate baseline correction can be achieved even in a case where the baseline varies in the non-calculation period.

What is claimed is:

1. A signal processing apparatus comprising:
an input unit configured to input a measurement signal;
a noise calculation unit configured to apply a statistical process to the measurement signal having the number of data as a first number of data, inputted to the input unit to calculate a noise value indicating a variation of the measurement signal;
a calculation threshold setting unit configured to set, based on the noise value calculated by the noise calculation unit, a calculation threshold used for determining a non-calculation period of a baseline;
a period determination unit configured to determine a period where a difference between the measurement signal inputted to the input unit and a moving average value calculated in a previous cycle exceeds the calculation threshold set by the calculation threshold setting unit, to be the non-calculation period;
a moving average calculation unit configured such that the measurement signal is moving-averaged for each second number of data to calculate the moving average value in a period excluding the non-calculation period determined by the period determination unit and the moving average value calculated immediately before the non-calculation period is calculated in the non-calculation period to be the moving average value;
an updating unit configured to update the measurement signal inputted to the input unit to be a value in which the moving average value currently calculated by the moving average calculation unit is subtracted from the measurement signal; and
a memory unit configured to store the measurement signal updated by the updating unit,
wherein
the first number of data and the second number of data are set independently, and
the first number of data is set to be larger than the second number of data.

2. The signal processing apparatus according to claim 1, further comprising:
a signal threshold generation unit configured to generate a signal threshold used for determining whether it is a reflected signal based on the noise value calculated by the noise calculation unit; and
a signal determination unit configured to compare an output value of the updating unit with the signal threshold generated by the signal threshold generation unit, thereby determining whether it is the reflected signal.

3. The signal processing apparatus according to claim 2, wherein
the signal threshold generation unit generates a value larger than the calculation threshold, to be the signal threshold.

4. The signal processing apparatus according to claim 1, wherein
the updating unit updates the measurement signal to be a value in which a time of the measurement signal with respect to a time of the moving average value is shifted by a predetermined adjustment period and the moving average value is subtracted from the measurement signal.

5. The signal processing apparatus according to claim 1, wherein
the moving average calculation unit does not use the measurement signal inputted during a period between a start time of the non-calculating period and a time a predetermined prior period prior to the start time of the non-calculating period, for calculation of the moving average value.

6. The signal processing apparatus according to claim 1, wherein
the moving average calculation unit does not use the measurement signal inputted during a period from an end time of the non-calculating period to a time when a predetermined latter period elapses, for calculation of the moving average value.

7. The signal processing apparatus according to claim 1, wherein
the measurement signal is a received light signal received by a laser radar apparatus configured to sequentially emit laser light towards a plurality of azimuths; and
the signal processing apparatus includes a reset unit configured to reset, at each measurement completion timing for a single azimuth, the calculated moving average value and the noise value.

8. A signal processing apparatus comprising:
an input unit configured to input a measurement signal;
a noise calculation unit configured to apply a statistical process to the measurement signal having the number of data as a first number of data, inputted to the input unit to calculate a noise value indicating a variation of the measurement signal;
a calculation threshold setting unit configured to set, based on the noise value calculated by the noise calculation unit, a calculation threshold used for determining a non-calculation period of a baseline;

a period determination unit configured to determine a period where a difference between the measurement signal inputted to the input unit and a moving average value calculated in a previous cycle exceeds the calculation threshold set by the calculation threshold setting unit, to be the non-calculation period;

a moving average calculation unit configured such that the measurement signal in a period excluding the non-calculation period determined by the period determination unit is moving-averaged for each second number of data to calculate the moving average value;

a differential calculation unit configured to calculate a differential value of the moving average value calculated by the moving average calculation unit;

a moving average estimation unit configured to estimate the moving average value in the non-calculation period in accordance with the differential value calculated immediately before the non-calculation period by the differential calculation unit and the moving average value calculated immediately before the non-calculation period by the moving average calculation unit, the moving average value in the non-calculation period including an initial value used for the moving average calculation unit to calculate the moving average value after the non-calculation period;

an updating unit configured to update the measurement signal inputted to the input unit to be a value in which the moving average value currently calculated or estimated by the moving average calculation unit or the moving average estimation unit is subtracted from the measurement signal; and a memory unit configured to store the measurement signal updated by the updating unit, wherein the first number of data and the second number of data are set independently.

* * * * *